(12) United States Patent
Ueno et al.

(10) Patent No.: US 11,859,703 B2
(45) Date of Patent: Jan. 2, 2024

(54) POWER TRANSMISSION DEVICE FOR VEHICLE

(71) Applicant: HITACHI CONSTRUCTION MACHINERY CO., LTD., Tokyo (JP)

(72) Inventors: Hiroki Ueno, Kasumigaura (JP); Takuma Koinuma, Tsuchiura (JP)

(73) Assignee: HITACHI CONSTRUCTION MACHINERY CO., LTD., Tokyo (JP)

( * ) Notice: Subject to any disclaimer, the term of this patent is extended or adjusted under 35 U.S.C. 154(b) by 0 days.

(21) Appl. No.: 17/911,157

(22) PCT Filed: Sep. 23, 2021

(86) PCT No.: PCT/JP2021/034917
§ 371 (c)(1),
(2) Date: Sep. 13, 2022

(87) PCT Pub. No.: WO2022/071073
PCT Pub. Date: Apr. 7, 2022

(65) Prior Publication Data
US 2023/0105106 A1   Apr. 6, 2023

(30) Foreign Application Priority Data

Sep. 29, 2020 (JP) ................................. 2020-163688

(51) Int. Cl.
*F16H 47/04* (2006.01)
*E02F 9/22* (2006.01)

(52) U.S. Cl.
CPC ............ *F16H 47/04* (2013.01); *E02F 9/2253* (2013.01)

(58) Field of Classification Search
CPC ................ F16H 47/04; F16H 61/4069; F16H 2061/0481; E02F 9/2253; E02F 9/2079
See application file for complete search history.

(56) References Cited

U.S. PATENT DOCUMENTS

| 4,254,672 A * | 3/1981 | Mizuno ............... B60W 10/101 477/69 |
| 2020/0087892 A1* | 3/2020 | Kamiya ................ E02F 9/2292 |
| 2022/0290748 A1* | 9/2022 | Gono ..................... B60K 17/10 |

FOREIGN PATENT DOCUMENTS

| JP | H07332462 A | * 12/1995 |
| JP | 2007-64269 A | 3/2007 |
| JP | 2010-540866 A | 12/2010 |

OTHER PUBLICATIONS

International Search Report of PCT/JP2021/034917 dated Nov. 2, 2021.

* cited by examiner

*Primary Examiner* — Erin D Bishop
(74) *Attorney, Agent, or Firm* — MATTINGLY & MALUR, PC

(57) ABSTRACT

A transmission (21) as a power transmission device for a vehicle comprises an input shaft (22), an output shaft (23), and a planetary continuously variable transmission mechanism (31). The planetary continuously variable transmission mechanism (31) comprises a planetary gear mechanism (32), a pump side clutch (33), a hydraulic pump (36), a hydraulic motor (38), and a motor side clutch (40). The hydraulic pump (36) and the hydraulic motor (38) are connected via a pair of main lines (37A, 37B). When the transmission (21) is switched from a traveling state to a neutral state, at least one clutch (33, 40) of the pump side clutch (33) and the motor side clutch (40) is released.

8 Claims, 9 Drawing Sheets

POWER TRANSMISSION DEVICE FOR VEHICLE

TECHNICAL FIELD

The present invention relates to a power transmission device for a vehicle mounted on a wheel loader, for example, and capable of acquiring the optimum travel speed and drive force for various states of work.

BACKGROUND ART

Wheel loaders are operated in repeated patterns of a "V cycle" pattern primarily for loading burdens onto a dump truck and a "load & carry" pattern primarily for supplying burdens to a hopper. The "V cycle" pattern represents a movement for loading a dump truck with earth and sand excavated. The "load & carry" pattern represents a movement for transporting earth and sand excavated (load traveling), discharging into the hopper and forwarding (non-load traveling) the same. A wheel loader, in various operations including excavation, transportation, loading and forwarding, frequently switches between transmission mechanisms to acquire the optimum travel speed and drive force.

Representative drive systems of wheel loaders are roughly classified into 3 types: "transmission with torque converter", "hydrostatic continuously variable transmission (HST)" and "hydraulic mechanical continuously variable transmission (HMT)". Illustrative examples of a vehicle provided with a torque converter (hereafter also referred to as "torque converter vehicle") include lockup-type torque converter vehicles capable of mechanical connection to achieve a high efficiency.

In operation, a torque converter vehicle allows in a low-speed range the torque converter to achieve torque amplification, which is advantageous when large torques are required for starting a vehicle body or excavating earth and sand. Unfortunately, the torque amplification causes the torque converter to slide and leads to reduced operational efficiencies. Specifically, while the operational efficiency increases with rises in the speed ratio, the efficiency reaches the maximum at a certain speed ratio and will subsequently be reduced. Thus, such a torque converter vehicle operated in a high-speed range tends to lower the efficiency. Nevertheless, a torque converter vehicle is configured to mechanically connect an engine's output shaft and a transmission's output shaft by means of a lockup mechanism to allow the power transmission efficiency to increase.

In vehicles with a hydrostatic continuously variable transmission, a hydraulic pump and/or a hydraulic motor in a hydrostatic continuously variable transmission are of variable displacement type. A vehicle with a hydrostatic continuously variable transmission changes its volume by controlling tilting of a variable displacement hydraulic pump or a hydraulic motor to control the vehicle speed and the tractive force. The efficiency is calculated from the product of the mechanical efficiency and the volume efficiency of a hydrostatic continuously variable transmission. The vehicle with a hydrostatic continuously variable transmission can be operated with a high efficiency of approximately 70 to 80% in a high-speed range, and a higher efficiency in a low-speed range can be provided than a torque converter vehicle.

Hydraulic mechanical continuously variable transmissions are configured to include a hydraulic power transmission mechanism operated by a hydraulic unit of a hydrostatic continuously variable transmission and a gear-driven mechanical power transmission mechanism (Patent Document 1). The input power from an engine to a hydraulic mechanical continuously variable transmission is divided and fed for hydraulic power transmission and mechanical power transmission, and the divided powers are subsequently connected and outputted. It is a planetary gear mechanism that contributes to dividing and connecting the power. The planetary gear mechanism in a vehicle with a hydraulic mechanical continuously variable transmission increases the ratio of the mechanical power transmission with a high transmission efficiency to the hydraulic power transmission with a low transmission efficiency as the vehicle speed rises. This configuration in the vehicle with a hydraulic mechanical continuously variable transmission can overcome a low efficiency of a torque converter vehicle in a low-speed range due to a slide as its drawback, and achieve a higher transmission efficiency in a high-speed range than the vehicle with a hydrostatic continuously variable transmission. In addition, the vehicle with a hydraulic mechanical continuously variable transmission can control the vehicle speed and the tractive force by changing the volume by tilting control of the hydraulic power transmission mechanism. Therefore, the vehicle with a hydraulic mechanical continuously variable transmission can control the distribution of input power by an engine between a cargo handling machine and a drive system.

PRIOR ART DOCUMENT

Patent Document

Patent Document 1: Japanese Patent Laid-Open No. 2010-540866 A (Patent Publication No. 5190513)

SUMMARY OF THE INVENTION

A vehicle with a hydraulic mechanical continuously variable transmission can achieve a high efficiency by continuously variable transmission when burdens are transported in a low-speed (5 to 10 km/h). However, the vehicle with a hydraulic mechanical continuously variable transmission hydraulically distributes the power even during transport at a high speed (10 to 20 km/h), which can reduce the transmission efficiency unlike the torque converter vehicle provided with a lockup mechanism. Likewise, the vehicle with a hydraulic mechanical continuously variable transmission hydraulically distributes the power during a forwarding operation at a speed (10 to 40 km/h), which can reduce the transmission efficiency unlike the torque converter vehicle provided with a lockup mechanism. For example, during an operation at a speed of 0 to 5 km/h, the difference in the efficiency between the vehicle with a hydraulic mechanical continuously variable transmission and the torque converter vehicle is nearly 0. On the other hand, during an operation at a speed of 5 to 10 km/h, the vehicle with a hydraulic mechanical continuously variable transmission provides a higher efficiency than the torque converter vehicle. Meanwhile, during an operation at a speed of 10 to 40 km/h, a torque converter vehicle provided with a lockup mechanism provides a higher efficiency than the vehicle with a hydraulic mechanical continuously variable transmission.

Therefore, to achieve higher efficiency power transmission, a transmission can be proposed such that during low-speed traveling and excavating and loading operations, a hydraulic mechanical continuously variable transmission transmits the power using hydraulic pressure with a high transmission efficiency for low-speed traveling operations and high operability, and during high-speed forwarding and transporting operations the power transmission is switched to a direct connecting mechanism with a high transmission efficiency for high-speed traveling operations. Specifically, a proposed power transmission device for a vehicle comprises: an input shaft rotated by a prime mover mounted on a vehicle, an output shaft outputting rotation to a traveling device of the vehicle, a planetary continuously variable transmission mechanism disposed between the input shaft and the output shaft, and changing speed of a rotation on the input shaft side and transmitting power to the output shaft side, a direct connecting mechanism transmitting the rotation on the input shaft side to the output shaft side by bypassing the planetary continuously variable transmission mechanism, an idler element mechanically connecting an output side of the planetary continuously variable transmission mechanism and an output side of the direct connecting mechanism, and a direct connecting clutch disposed between the input shaft and the idler element in the direct connecting mechanism, wherein the planetary continuously variable transmission mechanism comprises: a planetary gear mechanism connected to the input shaft side, a pump side clutch (first clutch) disposed on a first output side of the planetary gear mechanism, a hydraulic pump connected to the output side of the planetary gear mechanism via the pump side clutch, a hydraulic motor connected to the hydraulic pump via a pair of main lines; a motor side clutch (second clutch) disposed between the hydraulic motor and the idler element or the output shaft, and a member mechanically connecting to the idler element on a second output side of the planetary gear mechanism.

Such a configuration can cause more energy loss when both the pump side clutch and the motor side clutch are connected in a neutral state of cutting off or restricting transmission of the power from the prime mover to the traveling device. The neutral state is required in a case where a vehicle is allowed to stop, with an engine as a prime mover being in operation (rotation).

An object of the present invention to provide a power transmission device for a vehicle capable of reducing energy loss in a neutral state in a configuration where clutches are disposed on an output side of a planetary gear mechanism and an output side of a hydraulic motor respectively.

The present invention provides a power transmission device for a vehicle, comprising: an input shaft rotated by a prime mover mounted on a vehicle, an output shaft outputting rotation to a traveling device of the vehicle, and a planetary continuously variable transmission mechanism disposed between the input shaft and the output shaft, and changing speed of a rotation on the input shaft side and transmitting power to the output shaft side, wherein the planetary continuously variable transmission mechanism comprises: a planetary gear mechanism connected to the input shaft side, a first clutch disposed on an output side of the planetary gear mechanism, a hydraulic pump connected to the output side of the planetary gear mechanism via the first clutch, a hydraulic motor connected to the hydraulic pump via a pair of main lines; a second clutch disposed between the hydraulic motor and the output shaft side, and a controller controlling connection and release of the first clutch and the second clutch, wherein when the controller switches from a traveling state capable of transmitting the power from the prime mover to the traveling device to a neutral state of cutting off or restricting transmission of the power from the prime mover to the traveling device, the controller releases at least one of the first clutch and the second clutch.

According to the present invention, the power transmission device that can reduce energy loss in a neutral state in a configuration where a first clutch is disposed between a planetary gear mechanism and a hydraulic pump and a second clutch is disposed on an output side of a hydraulic motor.

BRIEF DESCRIPTION OF THE DRAWINGS

FIG. 4 is a block diagram showing the controller in FIG. 3 together with a communication valve (electromagnetic on-off valve) and the like.

MODE FOR CARRYING OUT THE INVENTION

Figure 5:
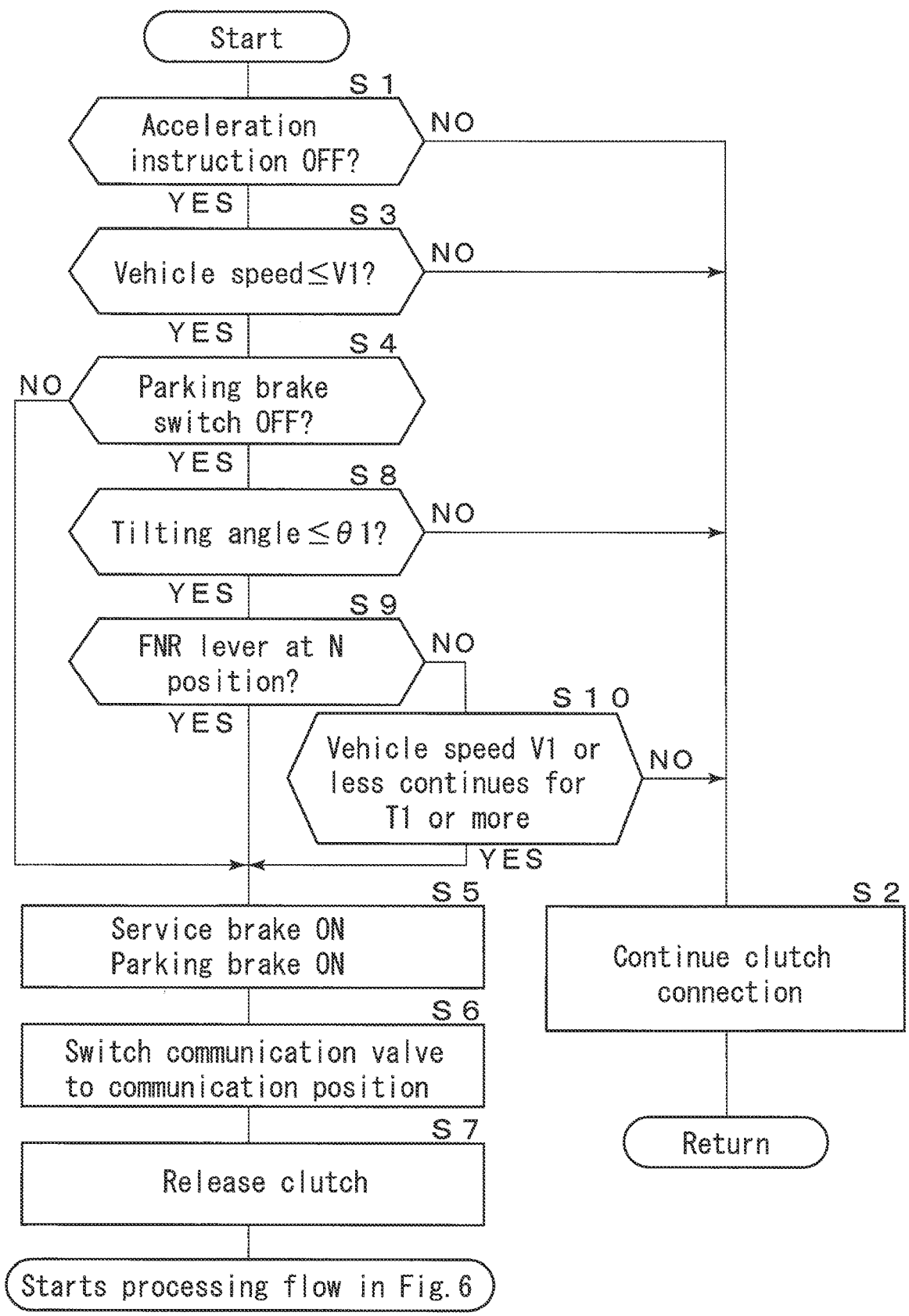
FIG. 5 is a flow chart showing a process by the controller when a pump side clutch (first clutch) and a motor side clutch (second clutch) are connected.
Figure 6:
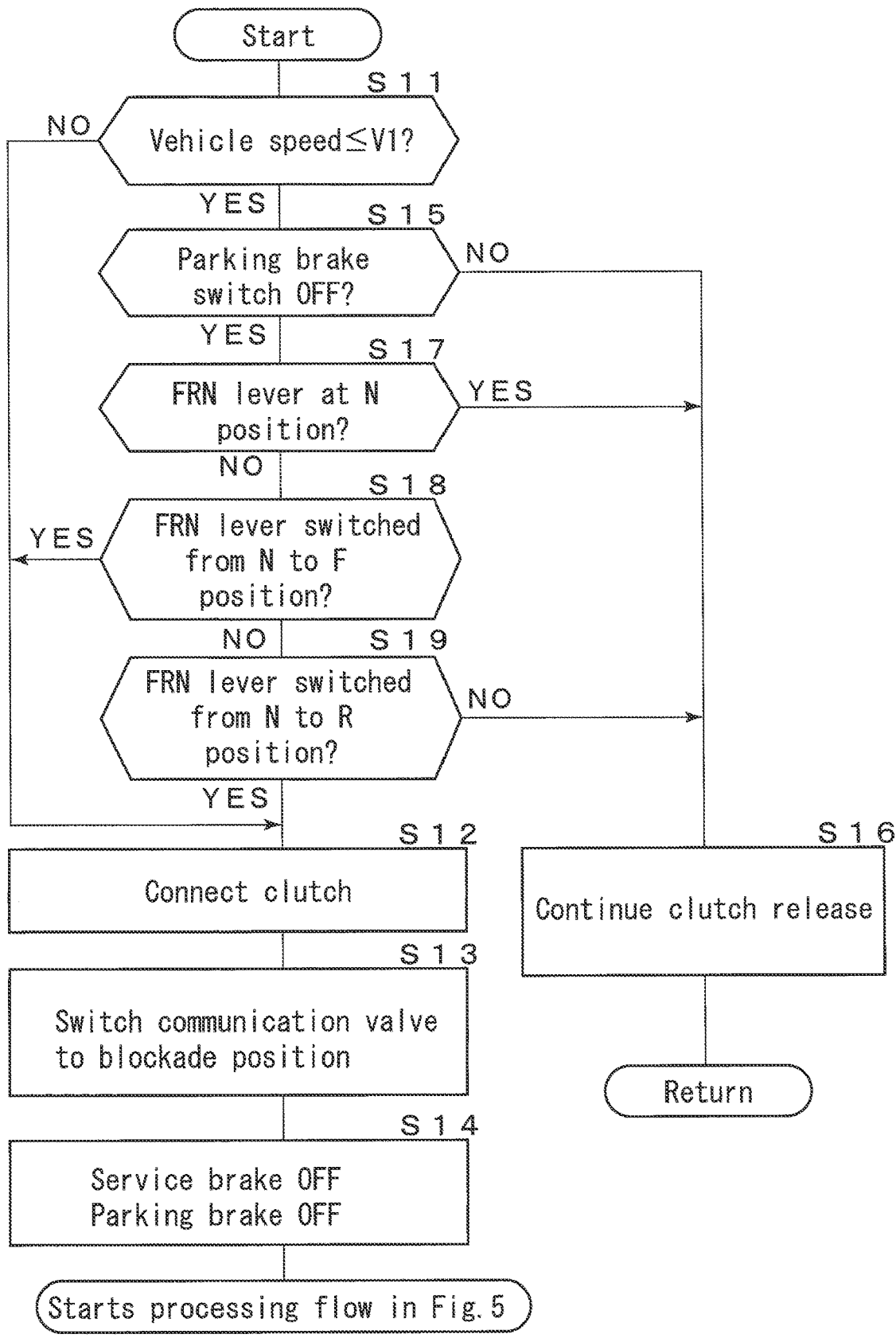
FIG. 6 is a flow chart showing a processing by the controller when the pump side clutch (first clutch) and the motor side clutch (second clutch) are released.

Hereinafter, a power transmission device for a vehicle according to each of embodiments in the present invention will be in detail explained with references to the accompanying drawings, by taking a case of being applied to a wheel loader as an example. Each step in flow charts shown in FIGS. 5 and 6 is indicated as notation "S" (for example, step 1 is indicated as "S1").

Figure 1:
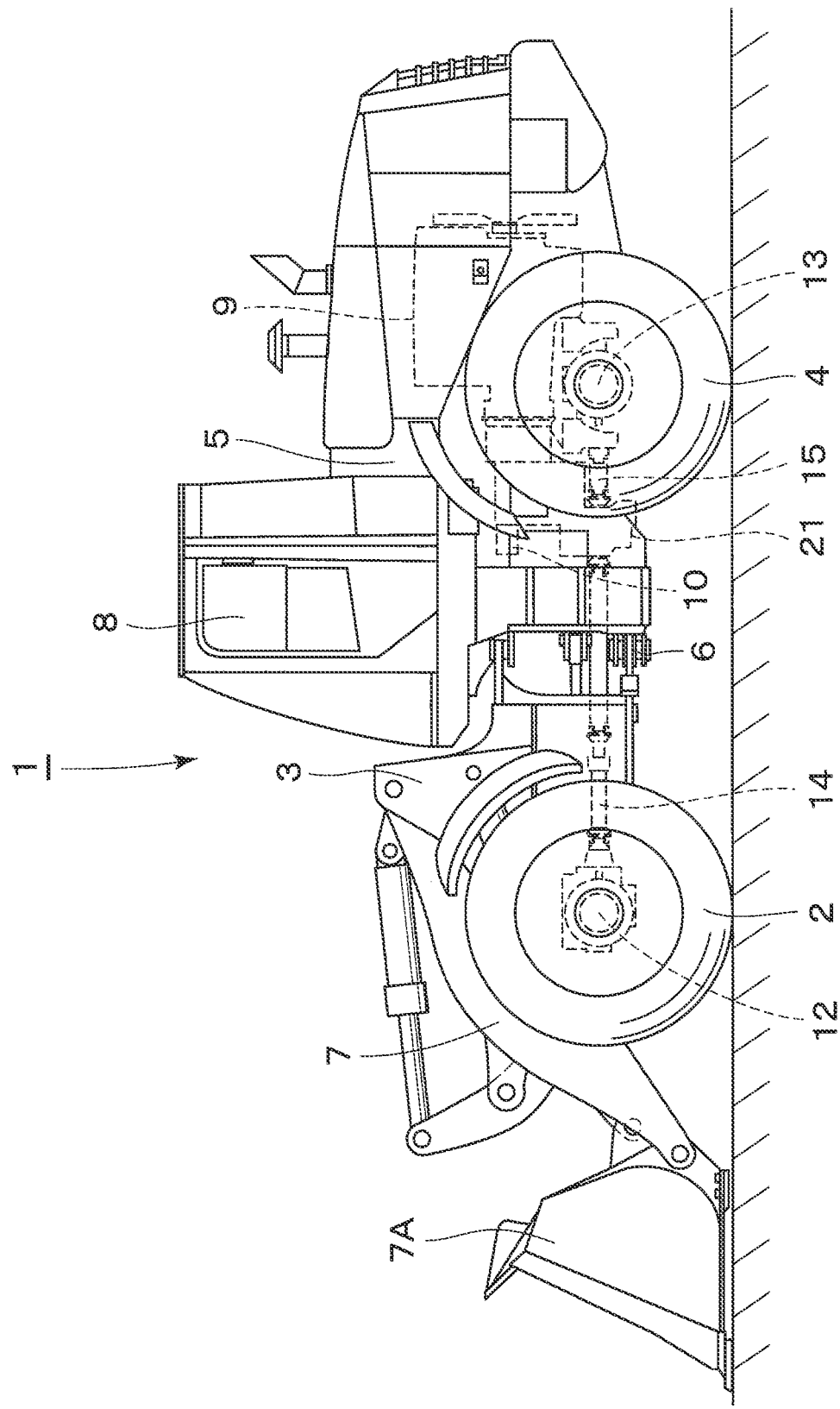
FIG. 1 is a left side view showing a wheel loader on which a power transmission device for a vehicle is mounted according to an embodiment.

FIGS. 1 to 7 show a power transmission device for a vehicle according to embodiments of the present invention. In FIG. 1, a wheel loader 1 is representative example of a vehicle (working vehicle). The wheel loader 1 is configured as an articulate-type working vehicle in which a front vehicle body 3 provided with left and right front wheels 2 is connected to a rear vehicle body 5 provided with left and right rear wheels 4 to be capable of bending in the left-and-right direction. That is, the front vehicle body 3 and the rear vehicle body 5 configures a vehicle body of the wheel loader 1. A center hinge 6 and a steering cylinder (not shown) are arranged between the front vehicle body 3 and the rear vehicle body 5. The front vehicle body 3 and the rear vehicle body 5 bend in the left-and-right direction, with the center hinge 6 positioned centrally by extending and contracting the steering cylinder. This allows to perform the steering of the wheel loader at the traveling.

A working mechanism 7 called also a cargo handling machine is disposed in the front vehicle body 3 of the wheel loader 1 to be capable of tilting/lifting thereto. The working mechanism 7 comprises a loader bucket 7A. On the other hand, a cab 8 that defines therein an operating room, an engine 9, a hydraulic pump 10, a transmission 21 as a speed-changing device and the like are arranged in the rear vehicle body 5 of the wheel loader 1.

Figure 7:
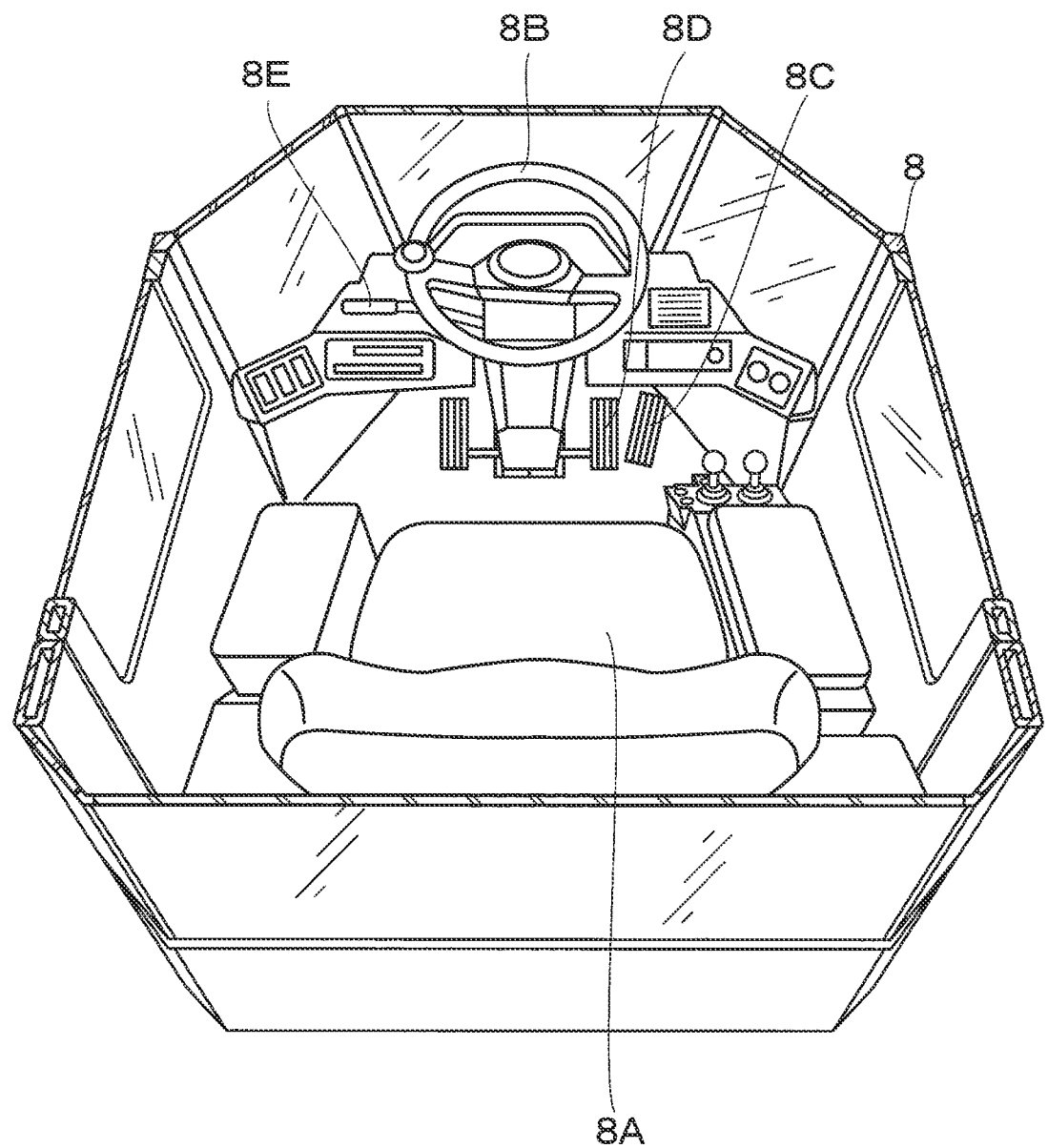
FIG. 7 is a partially broken perspective view showing the inside of a cab of the wheel loader in FIG. 1.

As shown in FIG. 7, an operator's seat 8A, a steering wheel 8B, an accelerator pedal 8C, a brake pedal 8D, an FNR lever 8E, a switch for parking brake and the like are provided in the cab 8. An operator operates the FNR lever 8E to switch between forward and retreat of the wheel loader 1 and to switch a shift stage. The operator switches the FNR lever 8E to a forward position (F) to advance the wheel loader 1. The operator switches the FNR lever 8E to a retreat position (R) to retreat the wheel loader 1. The operator switches the FNR lever 8E to a neutral position (N) to continue the stop of the wheel loader 1 without allowing it to travel. The operator rotates the FNR lever 8E around a lever shaft when switching the shift stages.

The engine 9 is a power source (prime mover) for the wheel loader 1. The power source (prime mover) can be configured one unit of the engine 9 as an internal combustion engine, besides may be configured with, for example, an engine and an electric motor or an electric motor unit. The hydraulic pump 10 is connected to the engine 9. The hydraulic pump 10 is a hydraulic power source for operating the working mechanism 7.

A front axle 12 extending in the left-and-right direction is disposed under the front vehicle body 3. The left and right front wheels 2 are attached in both ends of the front axle 12. On the other hand, a rear axle 13 extending in the left-and-right direction is disposed under the rear vehicle body 5. The left and right rear wheels 4 are mounted on both ends of the rear axle 13.

The front axle 12 is connected to a transmission 21 via a front propeller shaft 14. The rear axle 13 is connected to the transmission 21 via a rear propeller shaft 15. The transmission 21 reduces the rotation of the engine 9 to be transmitted to the front propeller shaft 14 and the rear propeller shaft 15. That is, the power from the engine 9 is transmitted to the transmission 21 connected to the engine 9.

Figure 2:
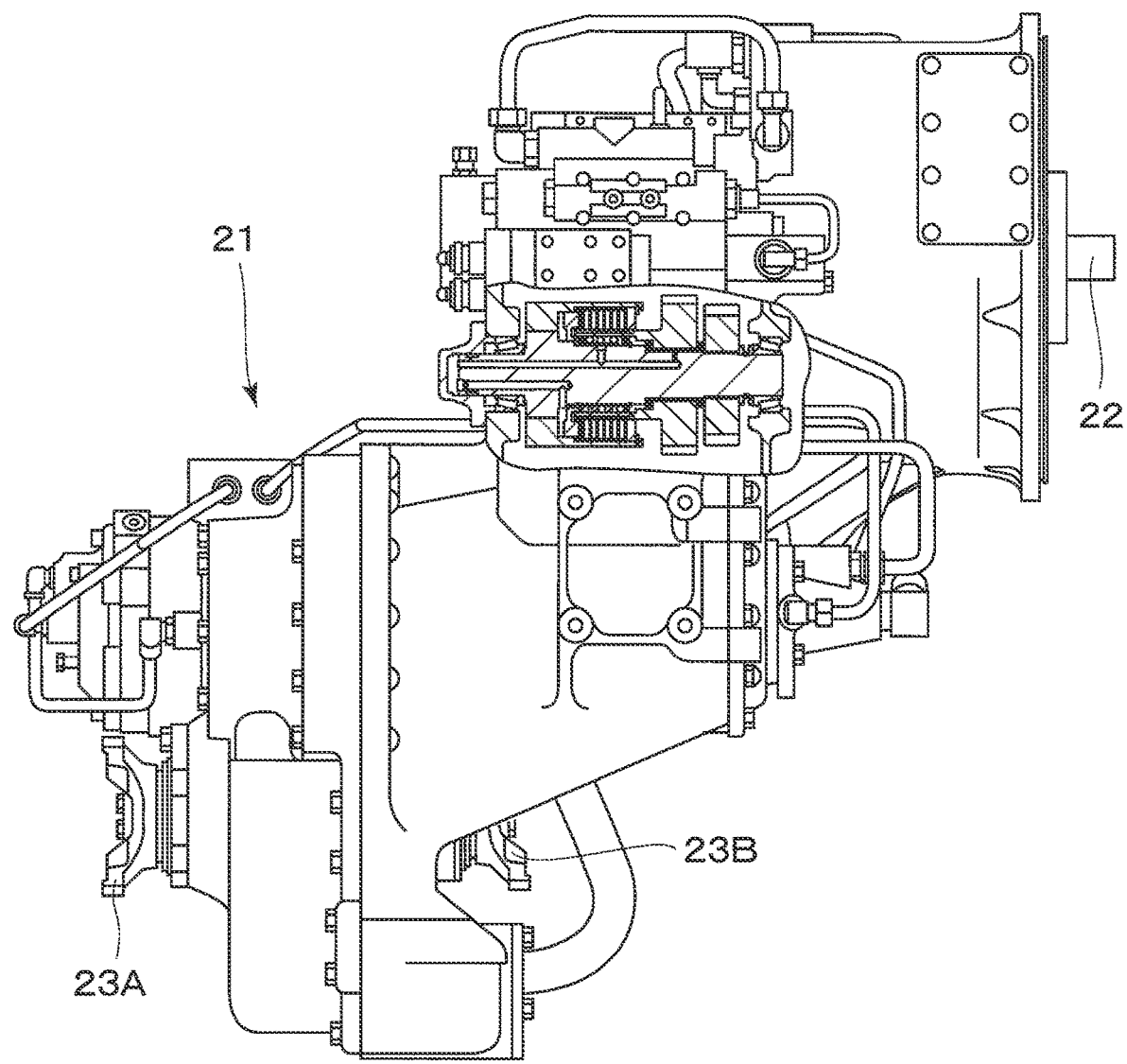
FIG. 2 is a partially broken side view showing a transmission (power transmission device for a vehicle) in FIG. 1.

The power from the engine 9 is transmitted from front and rear output shafts 23A, 23B of the transmission 21 to the front axle 12 and the rear axle 13 via the front propeller shaft 14 and the rear propeller shaft 15 after the transmission 21 controls the rotational speed and the rotating direction. That is, as shown in FIG. 2, the transmission 21 comprises an input shaft 22 connected to the engine 9, a front side output shaft 23A connected to the front propeller shaft 14, and a rear side output shaft 23B connected to the rear propeller shaft 15. The transmission 21 performs the switching of forward rotation and reverse rotation between the input shaft 22 and the output shafts 23A, 23B by switching a power transmission path in the transmission.

Figure 3:
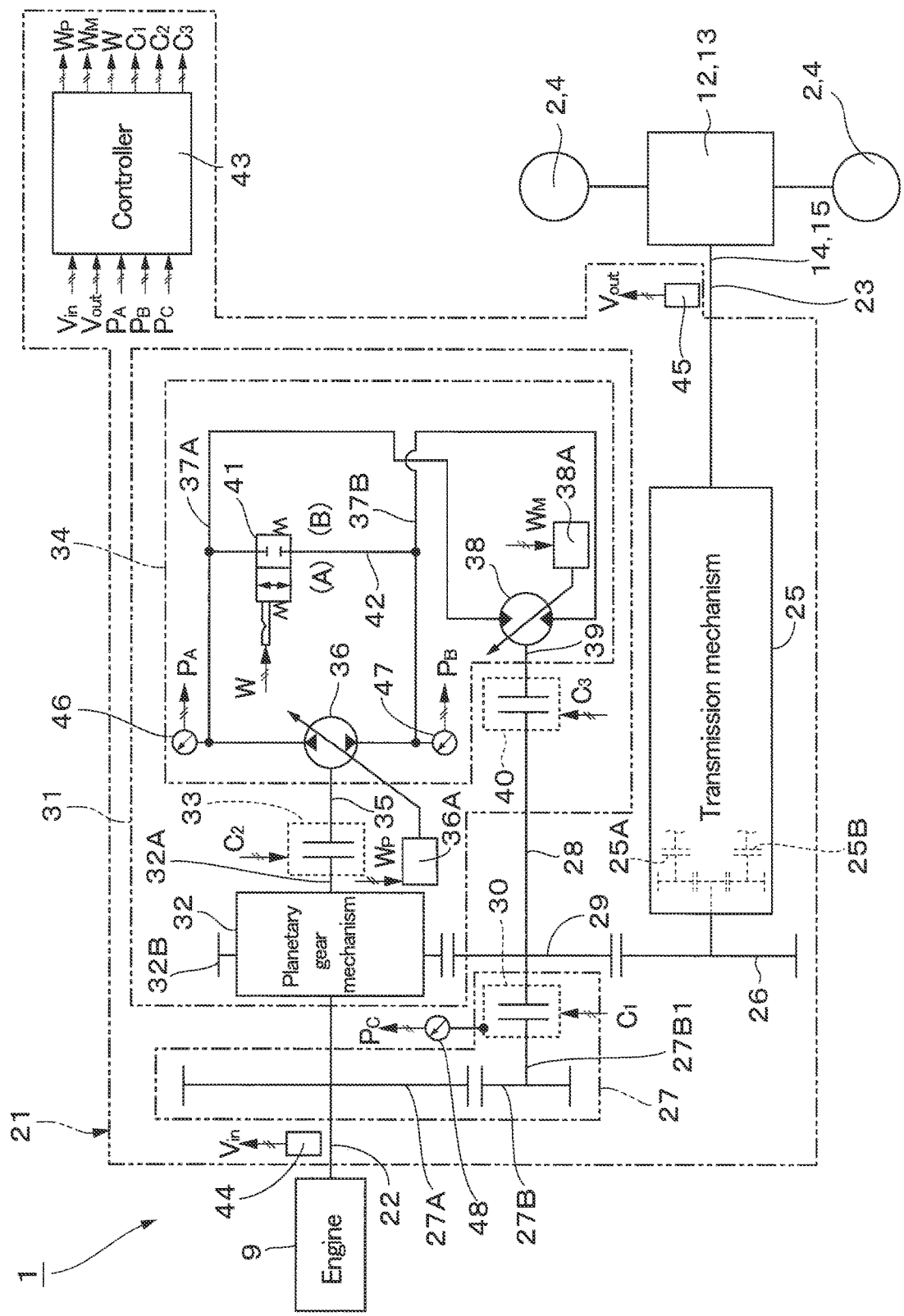
FIG. 3 is a configuration diagram showing a power transmission path of the wheel loader together with a controller.

Next, an explanation will be made of the transmission 21 according to an embodiment by referring to FIGS. 3 to 6, in addition to FIGS. 1 and 2. FIG. 3 schematically shows the output shaft 23 of the transmission 21 as a common output shaft 23 (=output shafts 23A, 23B) transmitting the power to both the front axle 12 and the rear axle 13 to avoid complexity of graphic configuration. That is, in FIG. 3, a configuration of dividing the power between the front side output shaft 23A and the rear side output shaft 23B via a center differential mechanism and the like, for example, is omitted.

The transmission 21 as a power transmitting device for a vehicle comprises an input shaft 22, an output shaft 23, a planetary continuously variable transmission mechanism 31, and a controller 43. Moreover, the transmission 21 comprises a transmission mechanism 25 as a stepped transmission mechanism, a direct connecting mechanism 27, a transmission shaft 28, and an idler gear 29 as an idler element.

The input shaft 22 is rotated by the engine 9, which is a prime mover mounted on a vehicle. That is, (a drive shaft of) the engine 9 is connected to the input shaft 22. On the other hand, the output shaft 23 outputs the rotation to the front axle 12 and/or the rear axle 13, which are traveling devices of the vehicle. That is, the power of the engine 9 is outputted from the output shaft 23 via the transmission 21 as a speed-changing device. The output shaft 23 outputs the rotation to the front wheel 2 and/or the rear wheel 4 via the front axle 12 and/or the rear axle 13 of the wheel loader 1. That is, the power of the output shaft 23 is transmitted to the front axle 12 and/or the rear axle 13, which are traveling devices.

The input power from the input shaft 22 to the transmission 21 is transmitted to the idler gear 29 via the planetary continuously variable transmission mechanism 31 or the direct connecting mechanism 27. The power transmitted to the idler gear 29 is outputted from the output shaft 23 through the transmission mechanism 25. The planetary continuously variable transmission mechanism 31 is disposed between the input shaft 22 and the output shaft 23. The planetary continuously variable transmission mechanism 31 changes the speed of a rotation on the input shaft 22-side and transmits the power to the output shaft 23-side. An input side of the planetary continuously variable transmission mechanism 31 is connected to the input shaft 22 provided with the input side gear 27A of the direct connecting mechanism 27. An output side of the planetary continuously variable transmission mechanism 31 is connected to the transmission shaft 28 provided with the idler gear 29.

The transmission mechanism 25 is disposed between the input shaft 22 and the output shaft 23 in series with the planetary continuously variable transmission mechanism 31 and the direct connecting mechanism 27. The transmission mechanism 25 also changes the speed of a rotation on the input shaft 22-side and transmits the power to the output shaft 23-side. In this case, the transmission mechanism 25 is disposed between an intermediate gear 26 meshing with the idler gear 29 and the output shaft 23. That is, an input side of the transmission mechanism 25 is connected to the intermediate gear 26. An output side of the transmission mechanism 25 is connected to the output shaft 23. The transmission mechanism 25 is configured as a step-shifting transmission mechanism, for example. The transmission mechanism 25 is configured to comprise a plurality of transmission shafts, a plurality of gears, and a plurality of clutches, for example. In this case, the transmission mechanism 25 can be configured as a transmission mechanism (DCT: Dual Clutch Transmission) including, for example, a forward clutch 25A to be connected when the wheel loader 1 is advanced and a reverse clutch 25B to be connected when the wheel loader 1 is retreated. For example, the forward clutch 25A is connected to the output shaft 23 when the FNR lever 8E of the cab 8 is at a forward position (F). The reverse clutch 25B is connected to the output shaft 23 when the FNR lever 8E of the cab 8 is at a retreat position (R). Such a transmission mechanism 25 may be omitted. That is, the intermediate gear 26 and the output shaft 23 may directly be connected not via the transmission mechanism 25.

The direct connecting mechanism 27 transmits a rotation on the input shaft 22-side to the output shaft 23-side by bypassing the planetary continuously variable transmission mechanism 31. That is, the direct connecting mechanism 27 directly transmits the rotation of the input shaft 22 to the transmission mechanism 25 not via the planetary continuously variable transmission mechanism 31. The direct connecting mechanism 27 comprises an input side gear 27A connected to the input shaft 22, an output side gear 27B meshing with the input side gear 27A, a rotational shaft 27B1 disposed coaxially with the transmission shaft 28, and a direct connecting clutch 30 as a third clutch. The rotation of the output side gear 27B is transmitted to the transmission shaft 28 via the direct connecting clutch 30. In an embodiment, the input side gear 27A is disposed on the input shaft 22. The output side gear 27B is disposed on the rotational shaft 27B1 disposed coaxially with the transmission shaft 28. The direct connecting clutch 30 is disposed coaxially between the transmission shaft 28 and the rotational shaft 27B1.

The transmission shaft 28 corresponds to an output shaft of the direct connecting mechanism 27 and an output shaft of the planetary continuously variable transmission mechanism 31. In this case, the transmission shaft 28 is disposed coaxially with the rotational shaft 27B1 of the direct connecting mechanism 27 and a motor shaft 39 of the planetary continuously variable transmission mechanism 31. The transmission shaft 28 is connected to the rotational shaft 27B1 of the direct connecting mechanism 27 via the direct connecting clutch 30. In a case where the direct connecting clutch 30 is connected, the rotation of the output side gear 27B of the direct connecting mechanism is transmitted to the transmission shaft 28. The transmission shaft 28 is connected to the hydraulic motor 38 of the planetary continuously variable transmission mechanism 31 via the motor side clutch 40. In a case where the motor side clutch 40 is connected, the rotation of the hydraulic motor 38 of the planetary continuously variable transmission mechanism 31 is transmitted to the transmission shaft 28. Moreover, the transmission shaft 28 is connected to the planetary output gear 32B of the planetary continuously variable transmission mechanism 31 via the idler gear 29.

The idler gear 29 as an idler element is disposed on the transmission shaft 28. The idler gear 29 mechanically connects the output side of the planetary continuously variable transmission mechanism 31 and the output side of the direct connecting mechanism 27. The idler gear 29 meshes with the planetary output gear 32B of the planetary gear mechanism 32 which configures the planetary continuously variable transmission mechanism 31. The idler gear 29 meshes with the intermediate gear 26. The rotation of the idler gear 29 is transmitted to the transmission mechanism 25 via the intermediate gear 26. That is, the input power from the input shaft 22 of the transmission 21 is transmitted to the idler gear 29 via the planetary continuously variable transmission mechanism 31 or the direct connecting mechanism 27. The power transmitted to the idler gear 29 is outputted from the output shaft 23 via the transmission mechanism 25.

The direct connecting clutch 30 is provided within the direct connecting mechanism 27 that is disposed between the input shaft 22 and the idler gear 29. That is, the direct connecting clutch 30 is disposed between the rotational shaft 27B1 of the output side gear 27B within the direct connecting mechanism 27 and the transmission shaft 28 provided with the idler gear 29. The direct connecting clutch 30 is capable of switching between a "connecting state (fastening state)" where the transmission of a rotation (torque, rotational force, power) is performed between the direct connecting mechanism 27 (rotational shaft 27B1) and the idler gear 29 (transmission shaft 28) and a "blocking state (releasing state)" where the transmission of the rotation transmission is cut off. In a case where the direct connecting clutch 30 is in the connecting state, the rotation of the output side gear 27B (rotational shaft 27B1) of the direct connecting mechanism 27 is transmitted to the idler gear 29 via the transmission shaft 28. In a case where the direct connecting clutch 30 is in the releasing state, the rotation of the output side gear 27B (rotational shaft 27B1) is not transmitted to the transmission shaft 28. The connection and release of the direct connecting clutch 30 are controlled based upon a command from the controller 43 (command signal $C_1$).

Next, an explanation will be made of the planetary continuously variable transmission mechanism 31.

The planetary continuously variable transmission mechanism 31 comprises the planetary gear mechanism 32, a pump side clutch 33 as a first clutch, a hydrostatic continuously variable transmission mechanism 34, and the motor side clutch 40 as a second clutch, and a controller 43. The hydrostatic continuously variable transmission mechanism 34 comprises a pump shaft 35, a hydraulic pump 36, a pair of main lines 37A, 37B, the hydraulic motor 38, the motor shaft 39, an electromagnetic on-off valve 41, and a connecting line 42.

The planetary gear mechanism 32 is connected to the input shaft 22-side. Specifically, the planetary gear mechanism 32 is connected to the input shaft 22. The planetary gear mechanism 32 is configured by one unit or step-shifting planetary gear device (not shown), a planetary output shaft 32A, and a planetary output gear 32B. The planetary gear device comprises a sun gear, a ring gear, and a carrier supporting a planetary gear meshing with the sun gear and the ring gear, for example. For example, the input shaft 22 is connected to any member(s) of the sun gear, the ring gear and the carrier. The planetary output shaft 32A is connected to any member(s) of the sun gear, the ring gear and the carrier to which the input shaft 22 is not connected. The planetary output gear 32B is connected to the remaining member(s) of the Sun gear, the ring gear and the carrier. The planetary output shaft 32A is connected to the pump shaft 35 of the hydrostatic continuously variable transmission mechanism 34 (hydraulic pump 36) via the pump side clutch 33. The rotation of the planetary output shaft 32A is transmitted to the pump shaft 35 of the hydrostatic continuously variable transmission mechanism 34 (hydraulic pump 36) via the pump side clutch 33. The planetary output gear 32B meshes with the idler gear 29. The rotation of the planetary output gear 32B is transmitted to the idler gear 29.

The pump side clutch 33 is disposed on the output side of the planetary gear mechanism 32. That is, the pump side clutch 33 is disposed between the planetary output shaft 32A of the planetary gear mechanism 32 and the pump shaft 35 (hydraulic pump 36) of the hydrostatic continuously variable transmission mechanism 34. The pump side clutch 33 is capable of switching between a "connecting state (fastening state)" where the transmission of a rotation is performed between the planetary gear mechanism 32 (planetary output shaft 32A) and the hydraulic pump 36 (pump shaft 35) of the hydrostatic continuously variable transmission mechanism 34 and a "blocking state (releasing state)" where the transmission of the rotation transmission is cut off. The rotation of the planetary output shaft 32A of the planetary gear mechanism 32 is transmitted to the hydraulic pump 36 via the pump shaft 35 of the hydrostatic continuously variable transmission mechanism 34 when the pump side clutch 33 is in the connecting state. The rotation of the planetary output shaft 32A is not transmitted to the pump shaft 35 when the pump side clutch 33 is in the releasing state. The connection and release of the pump side clutch 33 are controlled based upon a command from the controller 43 (command signal $C_2$).

The pump shaft 35 of the hydrostatic continuously variable transmission mechanism 34 corresponds to an input shaft of the hydrostatic continuously variable transmission mechanism 34. The pump shaft 35 is connected to a rotational shaft (input shaft) of the hydraulic pump 36. Alternatively, the pump shaft 35 corresponds to the rotational shaft (input shaft) of the hydraulic pump 36. The hydraulic pump 36 is connected to the output side of the planetary gear mechanism 32, or the planetary output shaft 32A of the planetary gear mechanism 32 via the pump side clutch 33. The hydraulic pump 36 circulates pressurized oil in the pair of main lines 37A, 37B by rotatively driving the pump shaft 35. The hydraulic pump 36 is configured by a variable displacement swash plate type of a hydraulic pump, for example. The hydraulic pump 36 includes a regulator 36A controlling the pump capacity. The regulator 36A of the hydraulic pump 36 is variably controlled based upon a command from the controller 43 (command signal $W_P$). The pair of main lines 37A, 37B connect a pair of supply and discharge ports of the hydraulic pump 36 and a pair of supply and discharge ports of the hydraulic motor 38.

The hydraulic motor 38 is connected to the hydraulic pump 36 via the pair of main lines 37A, 37B. The hydraulic motor 38 is rotated by pressurized oil fed from the hydraulic pump 36. The hydraulic motor 38 is configured by a variable displacement swash plate type of a hydraulic motor, for example. The hydraulic motor 38 includes a regulator 38A controlling the motor capacity. The regulator 38A of the hydraulic motor 38 is variably controlled based upon a command from the controller 43 (command signal $W_M$). The motor shaft 39 of the hydrostatic continuously variable transmission mechanism 34 corresponds to an output shaft of the hydrostatic continuously variable transmission mechanism 34. The motor shaft 39 is connected to a rotational shaft (output shaft) of the hydraulic motor 38. Alternatively, the motor shaft 39 corresponds to the rotational shaft (output shaft) of the hydraulic motor 38.

The motor side clutch 40 is disposed between the hydraulic motor 38 and the output shaft 23-side. That is, the motor side clutch 40 is disposed between the hydraulic motor 38 and the idler gear 29. As a result, the hydraulic motor 38 is connected to the idler gear 29 via the motor side clutch 40. In this case, the motor side clutch 40 is disposed between the motor shaft 39 of the hydrostatic continuously variable transmission mechanism 34 and the transmission shaft 28 provided with the idler gear 29. The motor side clutch 40 is capable of switching between a "connecting state (fastening state)" where transmission of a rotation is performed between the idler gear 29 (transmission shaft 28) and the hydraulic motor 38 (motor shaft 39) of the hydrostatic continuously variable transmission mechanism 34 and a "blocking state (releasing state)" where transmission of the rotation is cut off. The rotation of the motor shaft 39 of the hydrostatic continuously variable transmission mechanism 34 (=rotation of the hydraulic motor 38) is transmitted to the idler gear 29 via the transmission shaft 28 when the motor side clutch 40 is in the connecting state. The rotation of the motor shaft 39 is not transmitted to the transmission shaft 28 when the motor side clutch 40 is in the releasing state. The connection and release of the motor side clutch 40 are controlled based upon a command from the controller 43 (command signal $C_3$).

In an embodiment, the input power from the input shaft 22 of the transmission 21 can optionally be transmitted to the transmission mechanism 25 via the planetary continuously variable transmission mechanism 31, or transmitted to the transmission mechanism 25 via the direct connecting mechanism 27. As a result, if a planetary continuously variable transmission mechanism 31 is suitably operated, such a planetary continuously variable transmission mechanism 31 can be used. On the other hand, in a case where the direct connecting mechanism 27 suitably changes the speed, the power can be transmitted via the direct connecting mechanism 27.

The direct connecting clutch 30 is released to connect the pump side clutch 33 and the motor side clutch 40 in a case where the power is transmitted to the transmission mechanism 25 via the planetary continuously variable transmission mechanism 31. In this case, the power may be distributed to the transmission mechanism 25-side via the planetary gear mechanism 32 and the hydrostatic continuously variable transmission mechanism 34, or the power may be transmitted to the transmission mechanism 25-side without transmitting the power to the hydrostatic continuously variable transmission mechanism 34 by setting the rotational speed of the hydraulic pump 36 at 0.

The state of releasing the direct connecting clutch 30, connecting the pump side clutch 33 and the motor side clutch 40, transmitting no power to the hydrostatic continuously variable transmission mechanism 34 but transmitting the power to the transmission mechanism 25-side is referred to as "internal direct connection". On the other hand, the state of releasing the direct connecting clutch 30, connecting the pump side clutch 33 and the motor side clutch 40, transmitting the power to the hydrostatic continuously variable transmission mechanism 34 and transmitting the power to the transmission mechanism 25-side is referred to as the state of continuously variable transmission. During internal direct connection, the tilting (discharged capacity) of the hydraulic pump 36 is increased above a predetermined value and the tilting of the hydraulic motor 38 is set in a neutral state to allow for braking in the hydrostatic continuously variable transmission mechanism 34 and setting the rotational speed of the hydraulic pump 36 at 0. As a result, the power from the engine 9 is transmitted to the transmission mechanism 25. In fact, the rotational speed of the hydraulic pump 36 never reaches 0 because the hydraulic pump 36 and the hydraulic motor 38 are leaking oil, but most of the power from the engine 9 can be distributed to the transmission mechanism 25. On the other hand, in a case where the power is transmitted to the transmission mechanism 25 via the direct connecting mechanism 27, the direct connecting clutch 30 is connected to release the pump side clutch 33 and the motor side clutch 40.

Herein, the direct connecting clutch 30, the pump side clutch 33 and the motor side clutch 40 may each be adopted to a wet multiple-disk clutch or a synchromesh mechanism clutch. The wet multiple-disk clutch presses friction plates to generate a transmission torque. The synchromesh mechanism clutch allows small gears on end surfaces of hubs fixed on the shaft to mesh with each other to transmit the torque. The synchromesh mechanism clutch is smaller in size and larger in transmission torque capacity than the friction plate clutch because small gears are allowed to mesh with each other to transmit the torque. Moreover, with a small drag torque in the synchromesh mechanism clutch upon release of meshing, heat generation by dragging is smaller than in the wet multiple-disk clutch.

Therefore, in an embodiment, the pump side clutch 33 and the motor side clutch 40 are each an engagement clutch transmitting the rotation by meshing with a pawl portion, or a synchromesh mechanism clutch to reduce transmission torque loss. The direct connecting clutch 30 is a wet multiple-disk clutch. However, in a case where the pump side clutch 33 and the motor side clutch 40 are each a synchromesh mechanism clutch, it is difficult to connect and release the pump side clutch 33 and the motor side clutch 40 if the loads on the hydraulic pump 36 and the hydraulic motor 38 of the hydrostatic continuously variable transmission mechanism 34 are not reduced.

Therefore, in an embodiment, the hydrostatic continuously variable transmission mechanism 34 comprises an electromagnetic on-off valve 41 as a communication valve. That is, the pair of main lines 37A, 37B of the hydrostatic continuously variable transmission mechanism 34 are connected by the connecting line 42. Herein, the electromagnetic on-off valve 41 is provided on the way of the connecting line 42. As a result, the electromagnetic on-off valve 41 capable of switching between a communicating state and a blocking state between the pair of main lines 37A, 37B is provided between the pair of main lines 37A, 37B. The electromagnetic on-off valve 41 is capable of switching between an open position (A) corresponding to the communicating state and a closed position (B) corresponding to the blocking state. Switching of the electromagnetic on-off valve 41 is controlled based upon a command (command signal W) from the controller 43. The electromagnetic on-off valve 41 is at the closed position (B) cutting off the pair of main lines 37A, 37B in the state of power transmission through the planetary continuously variable transmission mechanism 31. On the other hand, the electromagnetic on-off valve 41 is switched to the open position (A) communicating the pair of main lines 37A, 37B when performing the power transmission path switched between the planetary continuously variable transmission mechanism 31 and the direct connecting mechanism 27. At this time, the pump side clutch 33 and the motor side clutch 40 are connected and released in a state of cutting off power transmission by hydraulic power in the hydraulic circuit of the planetary continuously variable transmission mechanism 31 in a short period of time by communicating the pair of main lines 37A, 37B. As a result, the power transmission is capable of switching from the planetary continuously variable transmission mechanism 31 to the direct connecting mechanism 27 and from the direct connecting mechanism 27 to the planetary continuously variable transmission mechanism 31.

Next, consideration will be made of a neutral state, that is, the neutral state of preventing transmission of the power from the engine 9 as a prime mover to the front axle 12 and/or the rear axle 13 as traveling devices via the output shaft 23 of the transmission 21. The neutral state is required in a case where the wheel loader 1 is allowed to stop with the engine 9 being operated (rotated). Herein, the neutral state corresponds to a state of "cutting off" or "restricting" transmission of the power from the engine 9 to the front axle 12 and/or the rear axle 13 (hereafter also referred to as "traveling devices 12, 13"). The state of "cutting off" transmission of the power from the engine 9 to the traveling devices 12, 13 corresponds to a state of switching the FNR lever 8E, for example, to the neutral position (N) and releasing the forward clutch 25A and the reverse clutch 25B of the transmission mechanism 25.

The state of "restricting" transmission of the power from the engine 9 to the traveling devices 12, 13 corresponds to a state of switching the FNR lever 8E, for example, to the forward position (F) or the retreat position (R) and connecting the forward clutch 25A or the reverse clutch 25B of the transmission mechanism 25, but no intention of an operator to drive the vehicle. The state of no intention of the operator to drive the vehicle corresponds to the state of, for example, a vehicle speed of V1 or less (V1: 0 to 1 km/h, substantially 0 km/h) and an acceleration instruction of 0 (depression of accelerator pedal 8C is 0). More specifically, the state corresponds to the state of, for example, switching the FNR lever 8E to the forward position (F) or the retreat position (R), but stopping the wheel loader 1 and the operator's depressing of the brake pedal 8D. In such a neutral state, that is, in a state where both the pump side clutch 33 and the motor side clutch 40 are connected when the power form the engine 9 is in the state of preventing (cutting off or restricting) from being transmitted to the traveling devices 12, 13, for example, the hydraulic pump 36 may remain in rotation, resulting in a large energy loss.

Therefore, in an embodiment, at least one clutch 33 (40) of the pump side clutch 33 and the motor side clutch 40 is released in the neutral state. More specifically, in the neutral state, both the pump side clutch 33 and the motor side clutch 40 are released. As a result, energy loss by rotation of the hydraulic pump 36 in the neutral state can be reduced.

In addition to that, in an embodiment, in the neutral state, the electromagnetic on-off valve 41 is switched from the closed position (B) to the open position (A). That is, the electromagnetic on-off valve 41 is at the closed position (B) when the planetary continuously variable transmission mechanism 31 is on the power transmission path. In other words, the electromagnetic on-off valve 41 is at the closed position (B) in the traveling state capable of transmitting the power from the engine 9 to the traveling devices 12, 13 via the planetary continuously variable transmission mechanism 31 and the output shaft 23. On the other hand, in the neutral state, the electromagnetic on-off valve 41 is switched from the closed position (B) to the open position (A). That is, in the neutral state, the electromagnetic on-off valve 41 is at the open position (A). Therefore, the hydraulic power transmission in the hydraulic circuit of the planetary continuously variable transmission mechanism 31 can be cut off by communicating the pair of main lines 37A, 37B and from this aspect, the energy loss in the neutral state can be reduced. Moreover, in the state of cutting off power transmission, the pump side clutch 33 and the motor side clutch 40 can be released. As a result, this also allows stable release of the pump side clutch 33 and the motor side clutch 40.

Furthermore, in an embodiment, after the tilting of the hydraulic pump 36 is minimized, the pump side clutch 33 and the motor side clutch 40 are released when the controller 43 switches from the traveling state to the neutral state. As a result, this allows smooth release of the pump side clutch 33 and the motor side clutch 40 in the state of reducing the load on the hydraulic pump 36. That is, in an embodiment, the pump side clutch 33 and the motor side clutch 40 are released when the controller 43 switches from the traveling state to the neutral state. In addition, the electromagnetic on-off valve 41 is switched from the closed position (B) to the open position (A) when the controller 43 switches from the traveling state to the neutral state.

Figure 4:
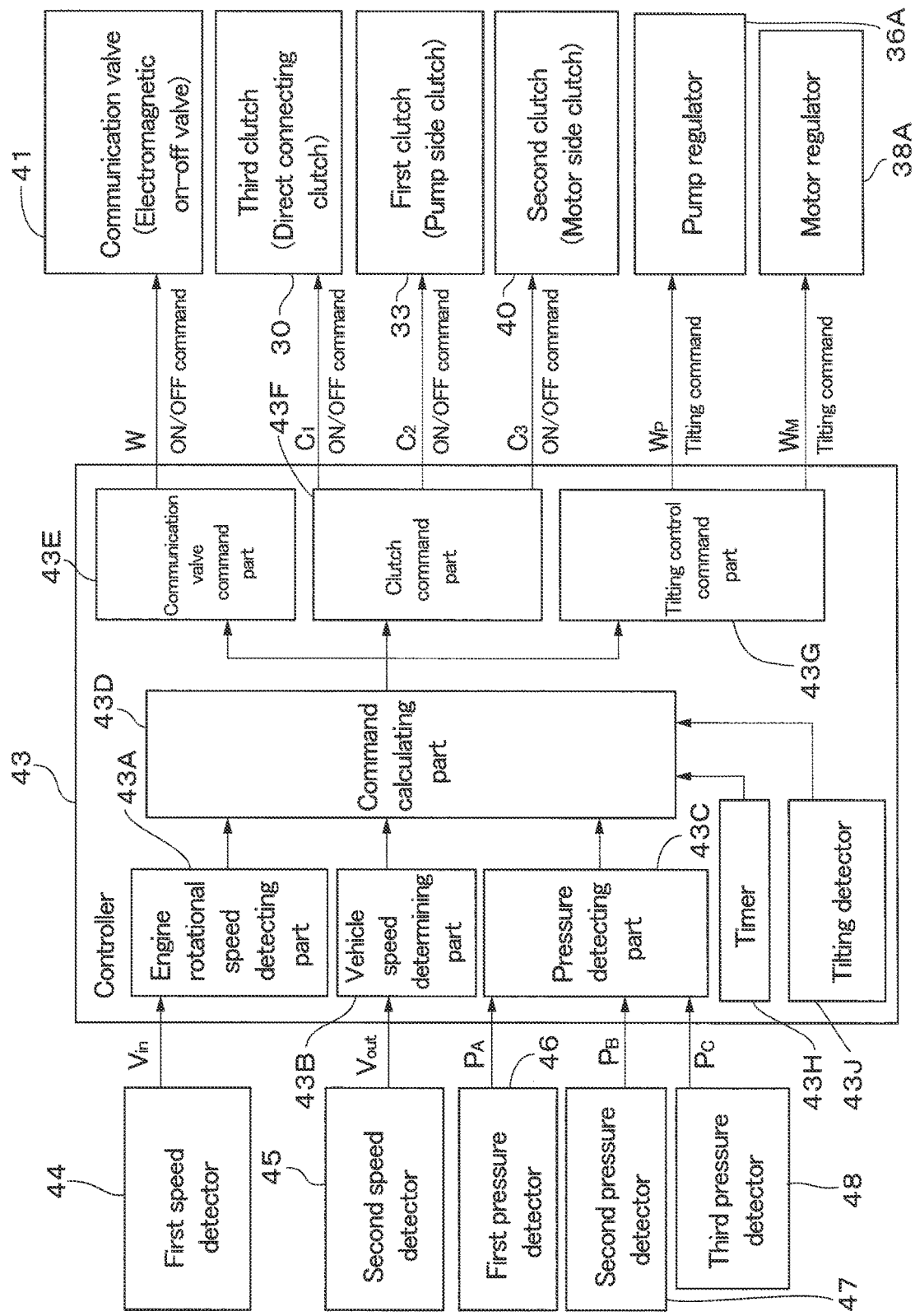

Next, an explanation will be made of the controller 43 of the transmission 21 with reference to FIGS. 3 and 4. Herein, FIG. 4 is block diagram showing the controller 43 in detail.

An input side of the controller 43 is connected to the first speed detector 44, the second speed detector 45, the first pressure detector 46, the second pressure detector 47, and the third pressure detector 48. An output side of the controller 43 is connected to the electromagnetic on-off valve 41, the direct connecting clutch 30, the pump side clutch 33, the motor side clutch 40, the regulator 36A of the hydraulic pump 36 of the planetary continuously variable transmission mechanism 31, and the regulator 38A of the hydraulic motor 38 of the planetary continuously variable transmission mechanism 31. The controller 43 is configured to comprise a microcomputer including a central processing unit (CPU), a memory and the like and the memory stores a processing program for performing an after-mentioned processing flow shown in FIGS. 5 and 6, that is, a processing program and the like used in processing a switching control of connection and release of the pump side clutch 33 and the motor side clutch 40.

The first speed detector 44 is disposed on the input shaft 22 of the transmission 21. The first speed detector 44 is a rotation detection sensor detecting the rotational speed and the rotating direction of the input shaft 22. The rotational speed of the input shaft 22 corresponds to the rotational speed of the engine 9 (hereafter referred to as "engine rotational speed $V_{in}$"). The first speed detector 44 outputs a detection signal corresponding to the engine rotational speed $V_{in}$ to the controller 43. The second speed detector 45 is disposed on the output shaft 23 of the transmission 21. The second speed detector 45 is a rotation detection sensor detecting the rotational speed of the output shaft 23 (hereafter referred to as "output rotational speed $V_{out}$") and the rotating direction. The output rotational speed $V_{out}$ corresponds to the vehicle speed. The second speed detector 45 outputs a detection signal corresponding to the output rotational speed $V_{out}$ and the rotating direction to the controller 43.

The first pressure detector 46 is disposed in one main line 37A. The first pressure detector 46 is a pressure sensor detecting the fluid pressure (pressure) of the one main line 37A. The first pressure detector 46 outputs a detection signal corresponding to the fluid pressure $P_A$ of the one main line 37A to the controller 43. The second pressure detector 47 is provided in the other main line 37B. The second pressure detector 47 is a pressure sensor detecting the fluid pressure (pressure) of the other main line 37B. The second pressure detector 47 outputs a detection signal corresponding to the fluid pressure $P_B$ of the other main line 37B to the controller 43. The third pressure detector 48 is disposed on the direct connecting clutch 30. The third pressure detector 48 is a pressure sensor detecting the clutching pressure (pressure) of the direct connecting clutch 30. The third pressure detector 48 outputs a detection signal corresponding to the clutch pressure $P_C$ of the direct connecting clutch 30 to the controller 43.

The controller 43 controls connection and release of the direct connecting clutch 30, the pump side clutch 33 and the motor side clutch 40. In a case where the power is transmitted to the transmission mechanism 25 via the direct connecting mechanism 27, the controller 43 connects the direct connecting clutch 30 to release the pump side clutch 33 and the motor side clutch 40. In this case, for example, corresponds to a high-speed mode capable of allowing the wheel loader 1 to travel at a high speed. In a case where the power is transmitted to the transmission mechanism 25 via the planetary continuously variable transmission mechanism 31, the controller 43 releases the direct connection clutch 30 to connect the pump side clutch 33 and the motor side clutch 40. In this case, for example, corresponds to a low-speed mode capable of allowing the wheel loader 1 to start or travel at a low speed. The controller 43 releases the direct connecting clutch 30 and releases both the pump side clutch 33 and the motor side clutch 40 in a neutral state.

The controller 43 controls communication and blockade of the electromagnetic on-off valve 41, in addition to the direct connecting clutch 30, the pump side clutch 33 and the motor side clutch 40. Herein, the state of releasing the direct connecting clutch 30 and connecting both the pump side clutch 33 and the motor side clutch 40, that is, the state capable of transmitting the power to the traveling devices 12, 13 via the planetary continuously variable transmission mechanism 31 and the output shaft 23 is defined as a first state (traveling state). On the other hand, the state of releasing the direct connecting clutch 30 and releasing both the pump side clutch 33 and the motor side clutch 40, that is, the state of cutting off or restricting transmission of the power to the traveling devices 12, 13 via the output shaft 23 is defined as a second state (neutral state).

In this case, when the controller 43 switches from the first state to the second state, the controller 43 releases the pump side clutch 33 and the motor side clutch 40 after the controller 43 switches the electromagnetic on-off valve 41 from the closed position (B) to the open position (A). On the other hand, when the controller 43 switches from the second state to the first state, the controller 43 switches the electromagnetic on-off valve 41 from the open position (A) to the closed position (B) after the controller 43 connects the pump side clutch 33 and the motor side clutch 40. That is, the controller 43 releases the pump side clutch 33 and the motor side clutch 40 when the controller 43 switches from the first state to the second state. Moreover, the controller 43 switches the electromagnetic on-off valve 41 from the closed position (B) to the open position (A) when the controller 43 switches from the first state to the second state.

In addition, the controller 43 switches the electromagnetic on-off valve 41 based upon the detection values of the first pressure detector 46 and the second pressure detector 47. The first pressure detector 46 and the second pressure detector 47 correspond to pressure detectors detecting the pressure differences of the pair of main lines 37A, 37B. The controller 43 switches the electromagnetic on-off valve 41 from the closed position (B) to the open position (A) when the detection values of the first pressure detector 46 and the second pressure detector 47 are a threshold value or less. More specifically, the controller 43 switches the electromagnetic on-off valve 41 from the closed position (B) to the open position (A) when a difference in the detection value between the first pressure detector 46 and the second pressure detector 47, that is, a pressure difference (differential pressure) between the pair of main lines 37A, 37B is a threshold value or less. The differential pressure may be detected using a differential pressure gauge (differential pressure detector) directly detecting the differential pressures. Moreover, the threshold value of the differential pressure can be determined such that the electromagnetic on-off valve 41 is switched from the closed position (B) to the open position (A) to restrict pressure variations, for example.

The controller 43 controls the tilting of the hydraulic pump 36 and the hydraulic motor 38 of the hydrostatic continuously variable transmission mechanism 34, in addition to the direct connecting clutch 30, the pump side clutch 33 and the motor side clutch 40 (that is, adjusts the pump capacity and the motor capacity). That is, the controller 43 controls the regulator 36A of the hydraulic pump 36 and the regulator 38A of the hydraulic motor 38. In this case, when the controller 43 switches from a traveling state to a neutral state, the controller 43 releases the pump side clutch 33 and the motor side clutch 40 after minimizing the tilting of the hydraulic pump 36.

As shown in FIG. 4, the controller 43 comprises an engine rotational speed detecting part 43A, a vehicle speed determining part 43B, a pressure detecting part 43C, a command calculating part 43D, a communication valve command part 43E, a clutch command part 43F, and a tilting control command part 43G. The engine rotational speed $V_{in}$ is inputted to the engine rotational speed detecting part 43A from the first speed detector 44. The engine rotational speed detecting part 43A outputs the engine rotational speed $V_{in}$ to the command calculating part 43D. The output rotational speed $V_{out}$ is inputted from the second speed detector 45 to the vehicle speed determining part 43B. The vehicle speed determining part 43B outputs the output rotational speed $V_{out}$ corresponding to the vehicle speed to the command calculating part 43D. The fluid pressures $P_A$, $P_B$ and the clutch pressure $P_C$ are inputted from the first pressure detector 46, the second pressure detector 47 and the third pressure detector 48 to the pressure detecting part 43C. The pressure detecting part 43C outputs the pressure difference between the fluid pressure $P_A$ and the fluid pressure $P_B$ (=differential pressures of the pair of main lines 37A, 37B) and the clutch pressure $P_C$ to the command calculating part 43D.

Moreover, the controller 43 comprises a timer 43H measuring the time and an inclination detector 43J detecting the inclination relative to its horizontal surface. The timer 43H measures, for example, the duration time for the wheel loader 1 to stop (stop duration time). Specifically, when the output rotational speed $V_{out}$ detected by the second speed detector 45 is a vehicle speed threshold value V1 or less, the timer 43H measures the duration time T for which the output rotational speed $V_{out}$ remains in this state, for example. The vehicle speed threshold value V1 is a determination value for determining whether or not the wheel loader 1 is stopped, and for example, V1 can be set at 0 to 1 km/h (substantially 0 km/h). The timer 43H outputs the measured time T to the command calculating part 43D. The inclination detector 43J is a tilt sensor (gradient sensor) detecting a tilting angle θ of the wheel loader 1 relative to the horizontal surface. The inclination detector 43J outputs the tilting angle θ to the command calculating part 43D.

The command calculating part 43D calculates a command for the electromagnetic on-off valve 41 (solenoid valve command), commands for the clutches 30, 33, 40 (clutch command), a command for the regulator 36A of the hydraulic pump 36 (pump command) and a command for the regulator 38A of the hydraulic motor 38 (motor command), based upon inputs from the engine rotational speed detecting part 43A, the vehicle speed determining part 43B, the pressure detecting part 43C, the timer 43H and the inclination detector 43J. The command calculating part 43D outputs the solenoid valve command to the communication valve command part 43E, outputs the clutch command to the clutch command part 43F, and outputs the pump command and the motor command to the tilting control command part 43G.

The solenoid valve command is inputted from the command calculating part 43D to the communication valve command part 43E. The communication valve command part 43E outputs a control command regarding opening and closing operations of the electromagnetic on-off valve 41 to the electromagnetic on-off valve 41 according to a solenoid valve command from the command calculating part 43D. That is, the communication valve command part 43E outputs an ON (communication)/OFF (blockade) signal W to the electromagnetic on-off valve 41. In this case, the ON (communication) corresponds to the open position (A) of the electromagnetic on-off valve 41, while the OFF (blockade) corresponds to the closed position (B) of the electromagnetic on-off valve 41. A clutch command is inputted from the command calculating part 43D to the clutch command part 43F. The clutch command part 43F outputs a control command regarding connection and release operations of the clutches 30, 33, 40 to the clutches 30, 33, 40, based upon clutch commands from the command calculating part 43D. That is, the clutch command part 43F outputs ON (connect)/OFF (release) signals $C_1$, $C_2$, $C_3$ to the clutches 30, 33, 40. In this case, the signal $C_1$ is outputted to the direct connecting clutch 30, the signal $C_2$ is outputted to the pump side clutch 33, and the signal $C_3$ is outputted to the motor side clutch 40.

A pump command and a motor command are inputted from the command calculating part 43D to the tilting control command part 43G. The tilting control command part 43G outputs a control command regarding tilting operations of the hydraulic pump 36 and the hydraulic motor 38 to the regulator 36A of the hydraulic pump 36 and the regulator 38A of the hydraulic motor 38, based upon a pump command and a motor command from the command calculating part 43D. That is, the tilting control command part 43G outputs swash plate or inclined shaft tilting command signals $W_P$, $W_M$ to the regulator 36A of the hydraulic pump 36 and the regulator 38A of the hydraulic motor 38. In this case, the tilting command signal $W_P$ is outputted to the regulator 36A of the hydraulic pump 36, and the tilting command signal $W_M$ is outputted to the regulator 38A of the hydraulic motor 38. The hydraulic pump 36 and the hydraulic motor 38 in the hydrostatic continuously variable transmission mechanism 34 are of variable displacement type. The hydraulic pump 36 and the hydraulic motor 38 changes the discharged capacity by changing the swash plate or inclined shaft tilting angle. The hydraulic pump 36 and the hydraulic motor 38 may be single tilting or both tilting.

Next, an explanation will be made of a specific control processing of connection and release of the pump side clutch 33 and the motor side clutch 40 by the controller 43. The direct connecting clutch 30 is released.

FIG. 5 shows a specific processing flow controlled by the controller 43 when the pump side clutch 33 and the motor side clutch 40 are connected, that is, a control processing (determination processing) when the pump side clutch 33 and the motor side clutch 40 are released from the connected state. The control processing in FIG. 5 is repeated in predetermined control cycles while, for example, the pump side clutch 33 and the motor side clutch 40 are connected, in other words, the planetary continuously variable transmission mechanism 31 can transmit the power.

For example, if an after-mentioned S12 processing in FIG. 6 connects the pump side clutch 33 and the motor side clutch 40, a processing flow in FIG. 5 will start. S1 in FIG. determines whether or not an acceleration instruction is OFF. For example, S1 determines whether or not the accelerator pedal 8C is OFF. S1 may determine whether or not the acceleration instruction is OFF by determining whether or not the brake pedal 8D is depressed. In a case where S1 determines "YES", that is, the acceleration instruction is OFF (the accelerator pedal 8C is not depressed), the processing will proceed to S3. On the other hand, in a case where S1 determines "NO", that is, the acceleration instruction is ON (the accelerator pedal 8C is depressed), the processing will proceed to S2. S2 continues the connection of the pump side clutch 33 and the motor side clutch 40 and the processing will return. That is, the processing gets back to "Start" via "Return" to repeat the processing after S1.

S3 determines whether or not the vehicle speed V of the wheel loader 1 is a vehicle speed threshold value V1 or less. The vehicle speed V corresponds to the speed of the actual wheel loader 1 (actual speed) detected by the second speed detector 45. The vehicle speed threshold value V1 is a threshold value for determining whether or not the wheel loader 1 is stopped, and for example, V1=0 to 1 km/h. If S3 determines "NO", that is, the vehicle speed V exceeds the threshold value V1, the processing will proceed to S2. If S3 determines "YES", that is, the vehicle speed V is a threshold value V1 or less, the processing will proceed to S4. S4 determines whether or not a parking brake switch disposed in the cab 8 is OFF. In a case where S4 determines "NO", that is, the parking brake switch is ON (braking provision), the processing will proceed to S5.

S5 turns the service brake ON, and the parking brake ON. The service brake is, for example, a wet multiple disk brake, which is disposed in the traveling devices 12, 13. The service brake is provided with braking forces by supplying pressurized oil. The parking brake is, for example, a negative brake disposed between the transmission mechanism 25 and the traveling devices 12, 13, and provided with braking forces by releasing the supply of pressurized oil. The following S6 switches the electromagnetic on-off valve 41 from the closed position (B) to the open position (A). At this time, the tilting of the hydraulic pump 36 is minimized. The following S7 releases the pump side clutch 33 and the motor side clutch 40. If S7 releases the pump side clutch 33 and the motor side clutch 40, the processing in FIG. 6 will start.

On the other hand, in a case where S4 determines "YES", that is, the parking brake switch is OFF, the processing will proceed to S8. S8 determines whether or not the tilting angle θ of the wheel loader 1 is an inclination threshold value θ1 or less. The tilting angle θ of the wheel loader 1 corresponds to the tilting angle of the actual wheel loader 1 detected by the inclination detector 43J. The inclination threshold value θ1 is a reference (threshold value) of the tilting angle for determining whether or not the stop of the wheel loader 1 can be maintained, for example, even by releasing the pump side clutch 33 and motor side clutch 40. The inclination threshold value θ1 can be calculated from the weight of the wheel loader 1 (vehicle weight), friction with the road surface and other factors when the wheel loader 1 is stopped on the inclined ground. In a case where S8 determines "NO", that is, the tilting angle θ of the wheel loader 1 is 01 or more, the processing will proceed to S2. On the other hand, in a case where S8 determines "YES", that is, the tilting angle θ of the wheel loader 1 is θ1 or less, the processing will proceed to S9.

S9 determines whether or not the FNR lever 8E is at the neutral position (N). In a case where S9 determines "YES", that is, the FNR lever 8E is at the neutral position (N), the processing will proceed to S5. On the other hand, in a case where S9 determines "NO", that is, the FNR lever 8E is not at the neutral position (N), the processing will proceed to S10. S10 determines whether or not the vehicle speed V remains V1 or less for the T1 hours. The elapsed time after the vehicle speed V is V1 or less is measured by the timer 43H. The threshold value T1 as a determination time can be set as the time determining the state of the working mechanism 7 of the wheel loader 1 to stop loading or the state of the vehicle to temporarily stop while loading. For example, the service brake is operated to stop the vehicle for about 2 to 6 seconds in the state of the FNR lever 8E at the forward position (F) while the working mechanism 7 loads burdens onto a dump truck. On the other hand, the vehicle stops for about 10 to 180 seconds while waiting for a dump truck in the state of the FNR lever 8E at the forward position (F).

Therefore, the threshold value T1 can, for example, be set between 3 to 60 seconds. As such, the controller 43 can determine from the time difference in vehicle stop to whether the loading operation is in the state of being stopped or the vehicle has temporarily stopped in the state of loading operation by using the timer 43H. In a case where S10 determines "YES", that is, the vehicle speed V remains V1 or less for the T1 hours or more, the processing will proceed to S5. On the other hand, in a case where S10 determines "NO", that is, the vehicle speed V doesn't remain V1 or less for the T1 hours or more, the processing will proceed to S2.

FIG. 6 shows a specific processing flow controlled by the controller 43 when the pump side clutch 33 and the motor side clutch 40 are released, that is, control processing (determination processing) when the pump side clutch 33 and the motor side clutch 40 are connected from the released state. The control processing in FIG. 6 is repeated in predetermined control cycles while, for example, the pump side clutch 33 and the motor side clutch 40 are released.

For example, if the above-described S7 processing in FIG. 5 releases the pump side clutch 33 and the motor side clutch 40, a processing flow in FIG. 6 will start. S11 in FIG. 6 determines whether or not the vehicle speed V of the wheel loader 1 is a vehicle speed threshold value V1 or less. In a case where S11 determines "NO", that is, the vehicle speed V exceeds the threshold value V1, the processing will proceed to S12. S12 connects the pump side clutch 33 and the motor side clutch 40. The following S13 switches the electromagnetic on-off valve 41 from the open position (A) to the closed position (B). The following S14 turns the service brake OFF, and turns the parking brake OFF. If S14 turns the service brake and the parking brake OFF, the processing in FIG. 5 will start.

On the other hand, in a case where S11 determines "YES", that is, the vehicle speed V is a threshold value V1 or less, the processing will proceed to S15. S15 determines whether or not the parking brake switch is OFF. In a case where S15 determines "NO", that is, the parking brake switch is ON, the processing will proceed to S16. S16 continues the release of the pump side clutch 33 and the motor side clutch and the processing will return. That is, the processing gets back to "Start" via "Return" to repeat the processing after S11. On the other hand, in a case where S15 determines "YES", that is, the parking brake switch is OFF, the processing will proceed to S17. S17 determines whether or not the FNR lever 8E is at the neutral position (N). If S17 determines "YES", that is, the FNR lever 8E is at the neutral position (N), the processing will proceed to S16. On the other hand, in a case where S17 determines "NO", that is, the FNR lever 8E is not at the neutral position (N), the processing will proceed to S18.

S18 determines whether or not the FNR lever 8E is operated from the neutral position (N) to the forward position (F). In a case where S18 determines "YES", that is, the FNR lever 8E is operated to the forward position (F), the processing will proceed to S12. On the other hand, in a case where S18 determines "NO", that is, the FNR lever 8E is not operated to the forward position (F), the processing will proceed to S19. S19 determines whether or not the FNR lever 8E is operated from the neutral position (N) to the retreat position (R). In a case where S19 determines "YES", that is, the FNR lever 8E is operated to the retreat position (R), the processing will proceed to S12. On the other hand, in a case where S19 determines "NO", that is, the FNR lever 8E is not operated to the retreat position (R), the processing will proceed to S16.

As described above, according to an embodiment, the pump side clutch 33 (first clutch) is provided on the output side of the planetary gear mechanism 32 (between the planetary gear mechanism 32 and the hydraulic pump 36). Moreover, the motor side clutch 40 (second clutch) is provided on the output side of the hydraulic motor 38 (between the hydraulic motor 38 and the idler gear 29). Then, the controller 43 releases both the pump side clutch 33 and the motor side clutch 40 in the neutral state of cutting off or restricting transmission of the power from the engine 9 to the traveling devices 12, 13. Therefore, energy loss in the neutral state can be reduced.

For example, the controller 43 releases both the pump side clutch 33 and the motor side clutch 40 in the state of switching the FNR lever 8E to the neutral position (N) and releasing the forward clutch 25A and the reverse clutch 25B of the transmission mechanism 25 (in the neutral state of cutting off power). Therefore, the power is not transmitted to the hydraulic pump 36 or the hydraulic motor 38. As a result, energy loss by rotation (idling) of the hydraulic pump 36 or the hydraulic motor 38 can be reduced. In addition, for example, while the FNR lever 8E is switched to the forward position (F) or the retreat position (R) and the forward clutch 25A or the reverse clutch 25B of the transmission mechanism 25 is connected, both the pump side clutch 33 and the motor side clutch 40 are released in the state of no intention of the operator to drive the vehicle (in the neutral state of restricting power). Therefore, the power is not transmitted to the hydraulic pump 36 or the hydraulic motor 38. As a result, also in this case, energy loss can be reduced. Moreover, in this case, the wheel loader 1 can immediately start only by connecting both the pump side clutch 33 and the motor side clutch 40 when the intention of the operator to drive the vehicle is detected by depressing the accelerator pedal 8C and the like. Therefore, this allows both reducing energy loss in the neutral state and improving responsiveness for the wheel loader 1 to start.

According to an embodiment, after the tilting of the hydraulic pump 36 is minimized, both the pump side clutch 33 and the motor side clutch 40 are released when the controller 43 switches from the traveling state capable of transmitting the power from the engine 9 to the traveling devices 12, 13 to the neutral state. In this way, the pump side clutch 33 and the motor side clutch 40 can smoothly be released in the state of reducing the load on the hydraulic pump 36. Therefore, in an embodiment, the vehicle releases both the pump side clutch 33 and the motor side clutch 40 when the controller 43 switches from the traveling state to the neutral state.

According to an embodiment, the electromagnetic on-off valve 41 is provided between the pair of main lines 37A, 37B connecting the hydraulic pump 36 and the hydraulic motor 38 as a communication valve. The electromagnetic on-off valve 41 is at the open position (A) as a communication position in the neutral state. That is, the controller 43 sets the electromagnetic on-off valve 41 at the open position (A) in the neutral state. Therefore, hydraulic power transmission in the hydraulic circuit of the planetary continuously variable transmission mechanism 31 (hydrostatic continuously variable transmission mechanism 34) can be cut off in the neutral state to accordingly reduce energy loss. Moreover, the pump side clutch 33 and the motor side clutch 40 can be released in the state of cutting off power transmission in the hydraulic circuit by setting the electromagnetic on-off valve 41 at the open position (A). As a result, the pump side clutch 33 and the motor side clutch 40 can also stably be released. Particularly, in an embodiment, the pump side clutch 33 and the motor side clutch 40 are each a synchromesh mechanism clutch. Therefore, the synchromesh mechanism clutch can stably be connected and released in the state of cutting off the power by rotation of the hydraulic pump 36 and the hydraulic motor 38 in a short period of time by allowing the electromagnetic on-off valve 41 to communicate the hydraulic pump 36 and the hydraulic motor 38. As a result, a synchromesh mechanism clutch with a low drag torque can be used when the pump side clutch 33 and the motor side clutch 40 are released, and a transmission 21 (transmission) having reduced power loss of the vehicle and a high transmission efficiency can be provided.

According to an embodiment, when the controller 43 changes the state (traveling state) of connecting both the pump side clutch 33 and the motor side clutch 40 to release both the pump side clutch 33 and the motor side clutch 40, the controller 43 releases both the pump side clutch 33 and the motor side clutch 40 after the controller 43 switches the electromagnetic on-off valve 41 from the closed position (B) as the blockade position to the open position (A) as the communication position. Therefore, the pump side clutch 33 and the motor side clutch 40 can smoothly be released in the state of cutting off hydraulic power transmission in the hydraulic circuit of the planetary continuously variable transmission mechanism 31 (hydrostatic continuously variable transmission mechanism 34) in a short period of time. Accordingly, in an embodiment, when the controller 43 switches from the traveling state to the neutral state, the electromagnetic on-off valve 41 is switched from the closed position (B) as the blockade position to the open position (A) as the communication position.

According to an embodiment, when the controller 43 changes the state (neutral state) of releasing both the pump side clutch 33 and the motor side clutch 40 to connect both the pump side clutch 33 and the motor side clutch 40, the controller 43 switches the electromagnetic on-off valve 41 from the open position (A) to the closed position (B) after the controller 43 connects both the pump side clutch 33 and the motor side clutch 40. Therefore, pressure variations can be reduced when the pump side clutch 33 and the motor side clutch 40 are connected, and the pump side clutch 33 and the motor side clutch 40 can smoothly be connected.

According to an embodiment, when the pressure difference of a pair of main lines 37A, 37B detected by the pressure detectors 46, 47 is a threshold value or less, the controller 43 switches the electromagnetic on-off valve 41 from the closed position (B) to the open position (A). Therefore, sharp pressure variations generated when the pair of main lines 37A, 37B are communicated by switching the electromagnetic on-off valve 41 from the closed position (B) to the open position (A) can be reduced.

According to an embodiment, the controller 43 comprises a second speed detector 45 detecting the rotational speed of the output shaft 23 and a timer 43H measuring the time. If the controller 43 determines from the second speed detector and the timer 43H that the stop duration time T (duration time during which the vehicle speed V is V1 or less) of the wheel loader 1 elapses in a predetermined T1 hours or more, the controller 43 releases the pump side clutch 33 and the motor side clutch 40. That is, the controller 43 determines that the loading operation is not temporarily stopped but disrupted, when the stop duration time T elapses in a predetermined time (T1 hours) or more to release the pump side clutch 33 and the motor side clutch 40. As a result, the pump side clutch 33 and the motor side clutch 40 can be released with proper timing to accordingly reduce energy loss.

According to an embodiment, the controller 43 comprises the FNR lever 8E. Moreover, the controller 43 releases the pump side clutch 33 and the motor side clutch 40 when the FNR lever 8E is at the neutral position (N). In addition, the controller 43 releases the pump side clutch 33 and the motor side clutch 40 if the vehicle speed V is V1 or less for a predetermined time (T1 hours) or more even when the FNR lever 8E is switched to the forward position (F) or the retreat position (R). Moreover, the controller 43 releases the pump side clutch 33 and the motor side clutch 40 when the controller 43 is provided with braking forces. As a result, the pump side clutch 33 and the motor side clutch 40 can be released when the operator has no intention to drive the vehicle.

According to an embodiment, the controller 43 connects the pump side clutch 33 and the motor side clutch 40 when the vehicle speed V of the wheel loader 1 exceeds V1. Therefore, the power from the engine 9 can be transmitted to the traveling devices 12, 13 when the power from the engine 9 should be transmitted to the traveling devices 12, 13. Moreover, the controller 43 continues the connection of the pump side clutch 33 and the motor side clutch 40 when the tilting angle θ detected by the inclination detector 43J exceeds the inclination threshold value θ1. Therefore, the state of stopping the vehicle can be maintained by continuing the connection of the pump side clutch 33 and the motor side clutch 40 when the wheel loader 1 stops on the inclined road surface.

According to an embodiment, a communication valve communicating and cutting off a pair of main lines 37A, 37B is defined as an electromagnetic on-off valve 41. Therefore, a section between the pair of main lines 37A, 37B can be switched from the blocking state to the communicating state by switching the electromagnetic on-off valve 41 from the closed position (B) as a blockade position to the open position (A) as a communication position. On the other hand, the section between the pair of main lines 37A, 37B can be switched from the communicating state to the blocking state by switching the electromagnetic on-off valve 41 from the open position (A) to the closed position (B).

The embodiments are explained by taking the case where the pump side clutch 33 and the motor side clutch 40 are each a synchromesh mechanism clutch as an example. However, not limited thereto, and for example, the pump side clutch (first clutch) and the motor side clutch (second clutch) may be a dog clutch or a wet multiple-disk clutch.

The embodiments are explained by taking the case where a communication valve communicating and cutting off a pair of main lines 37A, 37B is defined as an electromagnetic on-off valve 41 as an example. However, not limited thereto, and for example, like a first variant shown in FIG. 8, communication valves capable of switching between a communicating state and a blocking state between the pair of main lines 37A, 37B may be electromagnetic relief valves 51A, 51B capable of changing a set value (relief set value, relief starting pressure). Herein, the connecting line 42 connecting the pair of main lines 37A, 37B is provided with check valves 52, 53. The one check valve 52 allows pressurized oil to circulate from the one main line 37A-side to the other main line 37B-side and prevents the pressurized oil from circulating in the opposite direction. The other check valve 53 allows pressurized oil to circulate from the other main line 37B-side to the one main line 37A-side and prevents the pressurized oil from circulating in the opposite direction. Bypass lines 54, 55 bypassing the respective check valves 52, 53 are connected to the connecting line 42. The relief valves 51A, 51B are disposed on the way of the bypass lines 54, 55.

The electromagnetic relief valves 51A, 51B are configured by an electrically-operated variable relief valve changing the valve opening pressure (relief pressure) based upon a command signal (command signal W) from the controller 43. Changes in set values (relief set value, relief starting pressure) of the electromagnetic relief valves 51A, 51B are controlled based upon a command signal (command signal W) from the controller 43. The electromagnetic relief valves 51A, 51B are in a blocking state cutting off a pair of main lines 37A, 37B by raising the set value and in a communicating state communicating a pair of main lines 37A, 37B by lowering the set value.

Accordingly, the first variant uses electromagnetic relief valves 51A, 51B, which are each a variable relief valve, as a means of cutting off hydraulic power transmission in the hydrostatic continuously variable transmission mechanism 34. In the electromagnetic relief valves 51A, 51B, the relief pressure is normally set at a predetermined value on the high pressure side (for example, from 35 MPa to 50 MPa). Then, the controller 43 changes relief pressures of the electromagnetic relief valves 51A, 51B to the low-pressure side prescribed value (for example, the minimum) in the neutral state. That is, the pressure is relieved between the pair of main lines 37A, 37B by the electromagnetic relief valve 51A, 51B. Moreover, when the controller 43 switches from the first state (traveling state) of connecting both the pump side clutch 33 and the motor side clutch 40 to the second state (neutral state) of releasing the pump side clutch 33 and the motor side clutch 40, the controller 43 releases the pump side clutch 33 and the motor side clutch 40 after changing the relief pressures of the electromagnetic relief valves 51A, 51B to the low-pressure prescribed value (the minimum). On the other hand, when the controller 43 switches from the second state (neutral state) of releasing both the pump side clutch 33 and the motor side clutch 40 to the first state (traveling state) of connecting both the pump side clutch 33 and the motor side clutch 40, the controller 43 changes the relief pressures of the electromagnetic relief valves 51A, 51B to the high-pressure side prescribed value after connecting the pump side clutch 33 and the motor side clutch 40. Therefore, the pump side clutch 33 and the motor side clutch 40 can be connected and released in the state of cutting off power transmission by the hydraulic power in the hydrostatic continuously variable transmission mechanism 34.

Figure 8:
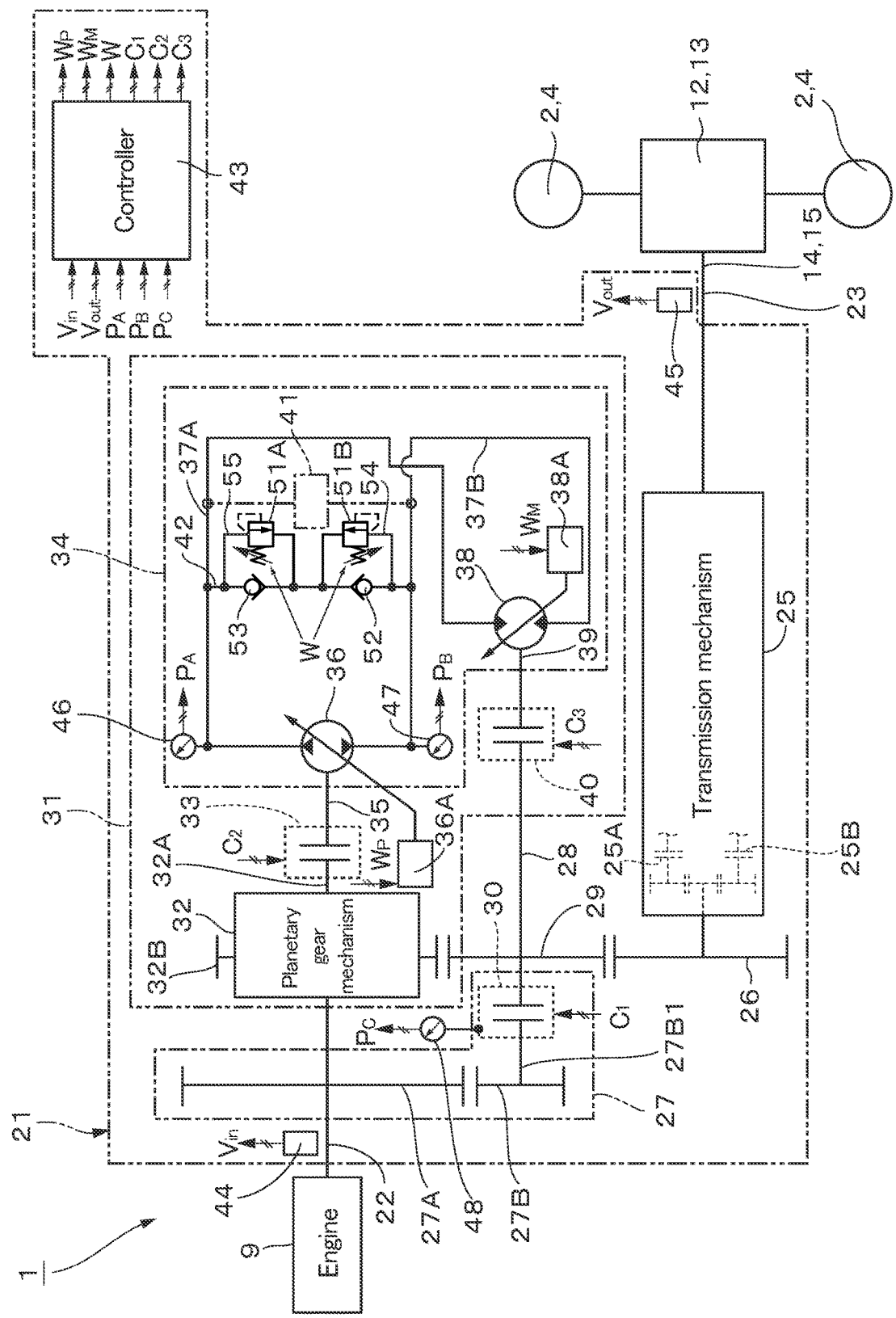
FIG. 8 is a configuration diagram showing the power transmission paths of a wheel loader on which a power transmitting device for a vehicle according to a first variant together with a controller.

As communication valves, it can be configured to provide both the electromagnetic on-off valve 41 and the electromagnetic relief valves 51A, 51B. That is, such a communication valve serves as the electromagnetic on-off valve 41 capable of switching from the open position (A) to the closed position (B) and the electromagnetic relief valves 51A, 51B capable of changing the set value. The electromagnetic on-off valve 41 and the electromagnetic relief valves 51A, 51B are disposed in parallel between the pair of main lines 37A, 37B. FIG. 8 shows an example of the electromagnetic on-off valve 41 with a two-dot chain line (virtual line). In this case, when the controller 43 switches from the first state (traveling state) of connecting both the pump side clutch 33 and the motor side clutch 40 to the second state (neutral state) of releasing the pump side clutch 33 and the motor side clutch 40, the controller 43 switches the electromagnetic on-off valve 41 from the closed position (B) to the open position (A) and releases the pump side clutch 33 and the motor side clutch 40 after the controller 43 changes the relief pressures of the electromagnetic relief valves 51A, 51B to the low-pressure prescribed value (the minimum). On the other hand, when the controller 43 switches from the second state (neutral state) of releasing both the pump side clutch 33 and the motor side clutch 40 to the first state (traveling state) of connecting both the pump side clutch 33 and the motor side clutch 40, the controller 43 switches the electromagnetic on-off valve 41 from the open position (A) to the closed position (B) and changes the relief pressures of the electromagnetic relief valves 51A, 51B to the high-pressure side prescribed value after the controller 43 connects the pump side clutch 33 and the motor side clutch 40.

Figure 9:
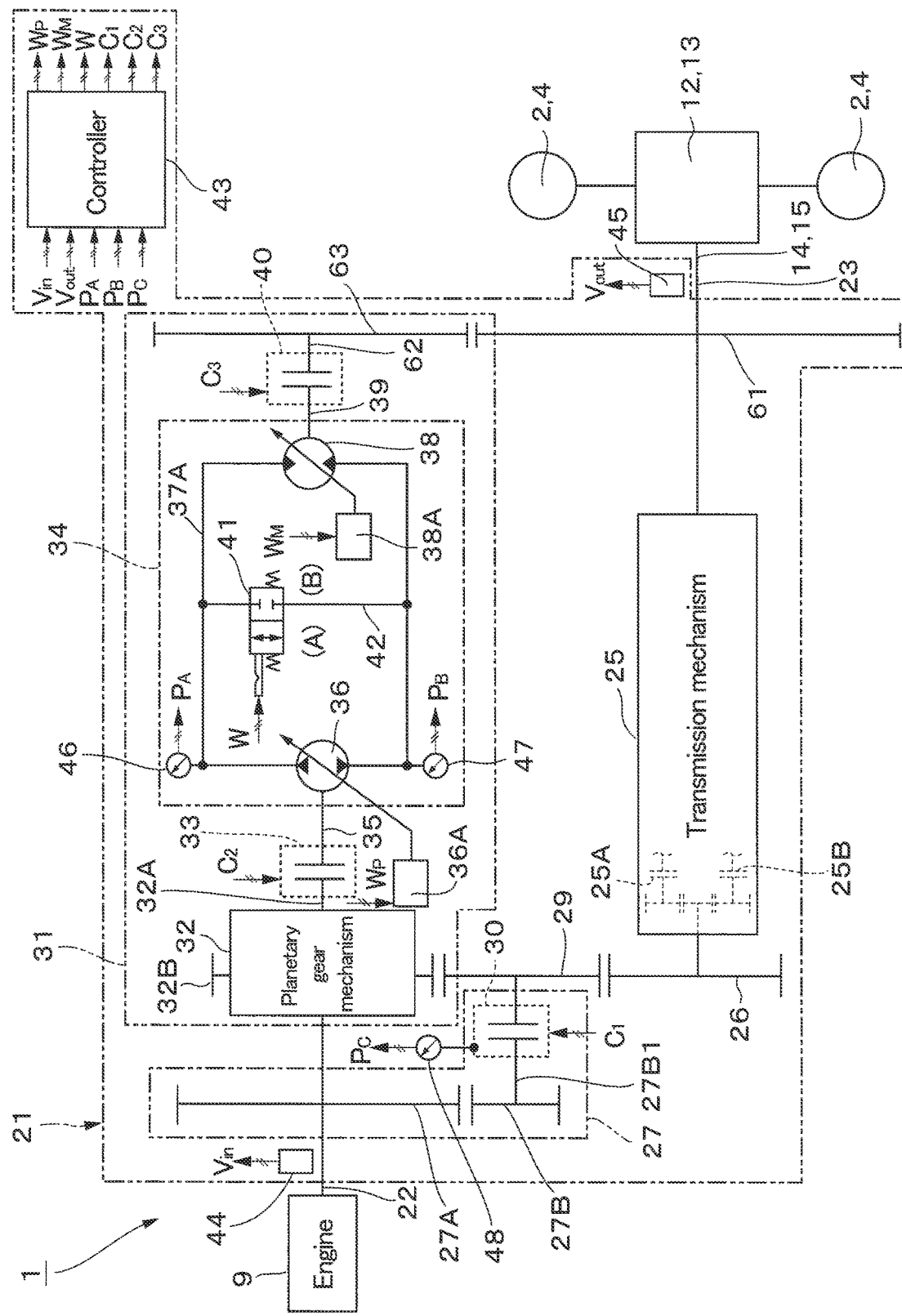
FIG. 9 is a configuration diagram of the power transmission paths of a wheel loader on which a power transmission device for a vehicle according to a second variant together with a controller.

The embodiments are described by taking the case where a motor side clutch 40 as a second clutch is provided between a hydraulic motor 38 of a planetary continuously variable transmission mechanism 31 and an idler gear 29 as an example. However, not limited thereto, and for example, like a second variant shown in FIG. 9, a motor side clutch 40 may be provided between the hydraulic motor 38 of the planetary continuously variable transmission mechanism 31 and the output shaft 23. That is, the output shaft 23 to be connected to the output side of the transmission mechanism 25 comprises an output shaft gear 61. The output shaft side transmission shaft 62 comprises a transmission gear 63 directly meshing with the output shaft gear 61 of the output shaft 23 or via a plurality of gears (not shown).

The motor side clutch 40 is disposed between the motor shaft 39 of the hydrostatic continuously variable transmission mechanism 34 and the output shaft side transmission shaft 62. The motor side clutch 40 is capable of switching between a "connecting state (fastening state)" where the transmission of the rotation is performed between the output shaft 23 and the hydrostatic continuously variable transmission mechanism 34 (the motor shaft 39 of the hydraulic motor 38) and a "blocking state (releasing state)" where the transmission of the rotation is disconnected. The rotation of the motor shaft 39 of the hydrostatic continuously variable transmission mechanism 34 (=rotation of the hydraulic motor 38) is transmitted to the output shaft 23 via the output shaft side transmission shaft 62, the transmission gear 63, and the output shaft gear 61 when the motor side clutch 40 is in the connecting state. The rotation of the motor shaft 39 is not transmitted to the output shaft side transmission shaft 62 when the motor side clutch 40 is in the releasing state. According to this second variant, the transmission mechanism 25 can be configured in small size.

The embodiments are explained by taking the case where an operating tool switching between a forward (F), a retreat (R) and a neutral (N) as operator's operation modes is an FNR lever 8E, and S9 in FIGS. 5 and S17 in FIG. 6 determine "YES" when the FNR lever 8E is at the neutral (N) position as an example. However, not limited thereto, and the operating tool may be an FNR switch, for example. Moreover, the operating tool may be an FR lever and an N switch, for example. Furthermore, the operating tool may be an FR switch and an N switch, for example.

The embodiments are explained by taking the case where the transmission 21 comprises the direct connecting mechanism 27, the transmission shaft 28, the idler gear 29, the direct connecting clutch 30 as a third clutch and the third pressure detector 48 as an example. However, not limited thereto, and for example, such a configuration, or the configuration of the direct connecting mechanism may be omitted. The embodiments are explained by taking the case where the configuration in which the electromagnetic on-off valve 41 is at the open position (A) in the neutral state as an example. However, not limited thereto, and the electromagnetic on-off valve 41 may remain at the closed position (B), not at the open position (A) in the neutral state. The embodiments are explained as an example of the case where the electromagnetic on-off valve 41 is switched before and after the connection and release of the pump side clutch 33 and the motor side clutch 40 as an example. However, not limited thereto the electromagnetic on-off valve 41 may not be switched before and after the connection and release of the pump side clutch 33 and the motor side clutch 40. This is applied to the electromagnetic relief valves 51A, 51B as well.

The embodiments are explained by taking the case where the controller 43 releases both the pump side clutch 33 and the motor side clutch 40 in the neutral state as an example. However, not limited thereto, and for example, the pump side clutch 33 may be released and the motor side clutch 40 may remain connected in the neutral state. Moreover, the motor side clutch 40 may be released and the pump side clutch 33 may remain connected in the neutral state. That is, the controller releases at least one clutch of the first clutch (pump side clutch) and the second clutch (motor side clutch) in the neutral state of cutting off or restricting the power from the prime mover to the traveling device. Preferably, at least the first clutch (pump side clutch) of the first clutch (pump side clutch) and the second clutch (motor side clutch) is released in the neutral state. In other words, the embodiments are explained by taking the case where the controller 43 releases both the pump side clutch 33 and the motor side clutch 40 when the controller switches from the traveling state to the neutral state as an example. However, not limited thereto, and for example, the pump side clutch 33 may be released and the motor side clutch 40 may remain connected when the controller switches from the traveling state to the neutral state. Moreover, the motor side clutch may be released and the pump side clutch 33 may remain connected in the neutral state when the controller switches from the traveling state to the neutral state. That is, the controller releases at least one clutch of the first clutch (pump side clutch) and the second clutch (motor side clutch) when the controller switches from the traveling state capable of transmitting the power from the prime mover to the traveling device to the neutral state. Preferably, at least the first clutch (pump side clutch) of the first clutch (pump side clutch) and the second clutch (motor side clutch) is released when the controller switches from the traveling state to the neutral state.

The embodiments are explained by taking the case where a transmission 21 as a power transmitting device for a vehicle is mounted on a wheel loader 1 as a working vehicle for example. However, not limited thereto, and for example, can widely be used as power transmission devices for various types of vehicles, for example, construction vehicles such as wheel-type excavators, transport vehicles such as lift trucks, farm vehicles such as tractors and the like.

DESCRIPTION OF REFERENCE NUMERALS

1: Wheel loader (Vehicle)
9: Engine (Prime mover)
12: Front axle (Traveling device)
13: Rear axle (Traveling device)
21: Transmission (Power transmission device for a vehicle)
22: Input shaft
23, 23A, 23B: Output shaft 31: Planetary continuously variable transmission mechanism
32: Planetary gear mechanism
33: Pump side clutch (First clutch)
36: Hydraulic pump
37A, 37B: Main line
38: Hydraulic motor
40: Motor side clutch (Second clutch)
41: Electromagnetic on-off valve (Communication valve)
43: Controller
51A, 51B: Electromagnetic relief valve (Communication valve)

The invention claimed is:

1. A power transmission device for a vehicle, comprising:
an input shaft rotated by a prime mover mounted on a vehicle;
an output shaft outputting rotation to a traveling device of the vehicle; and
a planetary continuously variable transmission mechanism disposed between the input shaft and the output shaft and changing speed of a rotation on the input shaft side and transmitting power to the output shaft side, wherein
the planetary continuously variable transmission mechanism comprises:
a planetary gear mechanism connected to the input shaft side;
a first clutch disposed on an output side of the planetary gear mechanism;
a hydraulic pump connected to the output side of the planetary gear mechanism via the first clutch;
a hydraulic motor connected to the hydraulic pump via a pair of main lines;
a second clutch disposed between the hydraulic motor and the output side of the planetary gear mechanism; and
a controller controlling connection and release of the first clutch and the second clutch, wherein
when the controller is switched from a traveling state capable of transmitting the power from the prime mover to the traveling device to a neutral state of cutting off or restricting transmission of the power from the prime mover to the traveling device, the controller releases at least one clutch of the first clutch and the second clutch.

2. The power transmission device for a vehicle according to claim 1, wherein
the controller controls the tilting of the hydraulic pump, in addition to the first clutch and the second clutch, and
when the controller is switched from the traveling state to the neutral state, the controller releases at least one clutch of the first clutch and the second clutch after the controller minimizes the tilting of the hydraulic pump.

3. The power transmission device for a vehicle according to claim 1, wherein a communication valve capable of switching between a communicating state and a blocking state between the pair of main lines is provided between the pair of main lines, and
the communication valve is switched from the blocking state to the communicating state when the controller is switched from the traveling state to the neutral state.

4. The power transmission device for a vehicle according to claim 3, wherein
the controller controls communication and blockade of the communication valve, in addition to the first clutch and the second clutch, and
when the controller releases at least one clutch of the first clutch and the second clutch from the state of connecting both the first clutch and the second clutch, the controller releases at least one clutch of the first clutch and the second clutch after switching the communication valve from the blocking state to the communicating state.

5. The power transmission device for a vehicle according to claim 3, wherein
the controller controls communication and blockade of the communication valve, in addition to the first clutch and the second clutch, and
when the controller connects both the first clutch and the second clutch from the state of releasing at least one clutch of the first clutch and the second clutch, the controller switches the communication valve from the communicating state to the blocking state after the controller connects both the first clutch and the second clutch.

6. The power transmission device for a vehicle according to claim 3, wherein
the communication valve is an electromagnetic on-off valve capable of switching between an open position corresponding to the communicating state and a closed position corresponding to the blocking state.

7. The power transmission device for a vehicle according to claim 3, wherein
the communication valve is an electromagnetic relief valve capable of changing a set value, which is increased to achieve the blocking state and decreased to achieve the communicating state.

8. The power transmission device for a vehicle according to claim 3, wherein
the communication valve includes an electromagnetic on-off valve capable of switching between an open position and a closed position and an electromagnetic relief valve provided between the pair of main lines and capable of changing a set value, and
the electromagnetic on-off valve and the electromagnetic relief valve are disposed in parallel between the pair of main lines.

* * * * *